(12) United States Patent
Molin et al.

(10) Patent No.: US 9,922,567 B2
(45) Date of Patent: Mar. 20, 2018

(54) VEHICULAR FLEET MANAGEMENT SYSTEM AND METHODS OF MONITORING AND IMPROVING DRIVER PERFORMANCE IN A FLEET OF VEHICLES

(75) Inventors: Hans M. Molin, Mission Viejo, CA (US); Ken D. Au, Irvine, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 367 days.

(21) Appl. No.: 14/233,319

(22) PCT Filed: Jul. 18, 2012

(86) PCT No.: PCT/US2012/047209
§ 371 (c)(1),
(2), (4) Date: Apr. 11, 2014

(87) PCT Pub. No.: WO2013/012926
PCT Pub. Date: Jan. 24, 2013

(65) Prior Publication Data
US 2014/0226010 A1    Aug. 14, 2014

Related U.S. Application Data

(60) Provisional application No. 61/527,569, filed on Aug. 25, 2011, provisional application No. 61/510,380, filed on Jul. 21, 2011.

(51) Int. Cl.
*G08G 1/00* (2006.01)
*H04N 7/01* (2006.01)
(Continued)

(52) U.S. Cl.
CPC ............... *G08G 1/20* (2013.01); *G06Q 10/06* (2013.01); *G07C 5/008* (2013.01); *H04N 7/01* (2013.01); *G07C 5/0816* (2013.01)

(58) Field of Classification Search
CPC ............... G08G 1/00; G08G 1/20; H04N 7/01
(Continued)

(56) References Cited

U.S. PATENT DOCUMENTS 5,718,239 A    2/1998   Newby
5,828,786 A *  10/1998  Rao .................... G06K 9/00711
                                                   348/415.1
(Continued)

FOREIGN PATENT DOCUMENTS

WO    2005113261    12/2005

OTHER PUBLICATIONS

International Search Report and Written Opinion from corresponding International Application No. PCT/US12/47209, dated Sep. 27, 2012.

*Primary Examiner* — Hee-Yong Kim
(74) *Attorney, Agent, or Firm* — Tucker Ellis, LLP

(57) ABSTRACT

A system and method is described in which vehicles are configured to collect driver and vehicle event data, selectively compress and encode the collected driver and vehicle event data, and communicate the compressed and encoded data wirelessly to one or more telematics service providers. Servers poll this driver event data periodically, process it, and present multiple methods to end users by which they are able to view and analyze it. The present system permits fleet managers to use this driver event data, received through a report or notification, or pulled directly from a web-based portal, to monitor, correct or reward driver behavior, and to implement driver education and training programs.

27 Claims, 28 Drawing Sheets

(51) Int. Cl.
*G08G 1/01* (2006.01)
*G08G 1/123* (2006.01)
*G06K 9/36* (2006.01)
*G06Q 40/00* (2012.01)
*G06Q 10/06* (2012.01)
*G07C 5/00* (2006.01)
*G07C 5/08* (2006.01)

(58) Field of Classification Search
USPC .......................................................... 348/148
See application file for complete search history.

(56) References Cited

U.S. PATENT DOCUMENTS

| | | |
|---|---|---|
| 6,389,340 B1 | 5/2002 | Rayner |
| 6,449,540 B1 | 9/2002 | Rayner |
| 7,536,457 B2 | 5/2009 | Miller |
| 7,649,827 B2 | 1/2010 | Hunter |
| 7,804,426 B2 | 9/2010 | Etcheson |
| 8,139,820 B2 | 3/2012 | Plante |
| 8,214,100 B2 | 7/2012 | Lowrey et al. |
| 8,269,617 B2 | 9/2012 | Cook |
| 8,311,858 B2 * | 11/2012 | Everett ............... G06Q 40/08 246/45 |
| 8,314,708 B2 | 11/2012 | Gunderson |
| 2003/0023476 A1 | 1/2003 | Gainey |
| 2005/0159170 A1 * | 7/2005 | Puranik ............... G08G 1/20 455/456.1 |
| 2006/0271246 A1 | 11/2006 | Bell et al. |
| 2007/0203637 A1 * | 8/2007 | Passman ............... G06Q 10/06 701/117 |
| 2007/0257781 A1 | 11/2007 | Denson |
| 2007/0257782 A1 | 11/2007 | Etcheson |
| 2007/0268158 A1 | 11/2007 | Gunderson et al. |
| 2007/0271105 A1 | 11/2007 | Gunderson |
| 2008/0043736 A1 | 2/2008 | Stanley |
| 2010/0208070 A2 | 10/2009 | Haynes |
| 2010/0152960 A1 | 6/2010 | Huber et al. |
| 2010/0191411 A1 | 7/2010 | Cook |
| 2010/0238009 A1 | 9/2010 | Cook |
| 2010/0250021 A1 | 9/2010 | Cook |
| 2011/0090075 A1 | 4/2011 | Armitage |
| 2011/0161380 A1 | 6/2011 | Keaveny et al. |
| 2012/0256770 A1 | 10/2012 | Mitchell |

\* cited by examiner

DRIVER REPORT: EVENT LIST

Event: ABS (severe)
Driver: Hans, Hans
Date Range: 5/8/2011 – 6/7/2011

| | | | |
|---|---|---|---|
| 151.1 | 6/2/2011 4:37:53 PM | Yes | Details/ Map Event |
| 151.1 | 6/2/2011 4:40:08 PM | Yes | Details/ Map Event |
| 151.2 | 6/2/2011 4:43:32 PM | Yes | Details/ Map Event |
| 151.2 | 6/2/2011 7:27:04 PM | Yes | Details/ Map Event |

FIG. 15

REGION REPORT

Region:
SELECT THE REGIONS TO COMPARE

Select — 2310

[▓] — 2320

Month:
THIS IS THE MONTH THAT WILL BE COMPARED TO THE MOST RECENT COMPARE MONTH

05/08/2011 [CAL] — 2330

Events:
SELECT THE EVENTS TO BE COMPARED

06/07/2011 [CAL]

— 2340

- [✓] Lane Departure Warning
- [✓] Excessive Lane Departure
- [ ] Lane Change w/o Turn Signal
- [ ] Loss of Video Tracking
- [ ] LDW System Disabled
- [ ] Distance Alert
- [ ] Forward Collision Warning
- [ ] Haptic Warning
- [ ] Collision Mitigation Braking
- [ ] ATC
- [ ] ESC
- [ ] RSC
- [ ] ABS
- [ ] Excessive Braking
- [ ] Excessive Curve Speed

[ Run Report ] — 2350

REGION REPORT — 2400

| | | | | | |
|---|---|---|---|---|---|
| East | Lane Departure Warning | 505 | 5,009 | 10 | 24022 | 210,243 | 9 |
| East | Excessive Lane Departure | 167 | 5,009 | 30 | 9308 | 210,243 | 23 |
| East | Excessive Braking | 0 | 5,009 | 0 | 10 | 210,243 | 21,024 |
| East | Excessive Curve Speed | 0 | 5,009 | 0 | 6 | 210,243 | 35,041 |

Table — 2450

FIG. 25

NOTIFICATIONS — 2500

| | | | | | | |
|---|---|---|---|---|---|---|
| Driver Division Report | Weekly | | 5/30/2011 12:00:08 PM | yes | Run Now | Edit | Delete |
| Severe Event Notification | Unlimited | | | yes | | Edit | Delete |

2510

Add notification — 2520

Please verify your notification settings.

| Report type: | Periodic automated reports |
|---|---|
| Report to send: | Driver / Division Report |
| Division to report on: | (All divisions) |
| Scheduling frequency: | Once a week |
| Recipients: | test@Bendix.com |

Cancel  Back «  Finish

FIG. 26

Please verify your notification settings.

| Report type: | Immediate notification of severe events |
|---|---|
| Events to report: | Excessive Braking; Excessive Curve Speed |
| Maximum frequency: | Unlimited |
| Recipients: | test@Bendix.com |

Cancel  Back «  Finish

FIG. 27

| Dashboard | Reports | Notifications | Fleet Management | User settings | Help | Logout |

MANAGE VEHICLE

| | | | | | |
|---|---|---|---|---|---|
| 1026694 | | | no | Edit | Delete |
| 1042693 | | | no | Edit | Delete |
| 409001 | | | no | Edit | Delete |
| 800101 | | | no | Edit | Delete |
| 9001 ← 3010 | | | no | Edit | Delete |
| Mike's | | | no | Edit | Delete |
| MW46 | | | no | Edit | Delete |
| ProStar | | | no | Edit | Delete |
| Volvo | | | no | Edit | Delete |

Add vehicle

FIG. 30

VEHICULAR FLEET MANAGEMENT SYSTEM AND METHODS OF MONITORING AND IMPROVING DRIVER PERFORMANCE IN A FLEET OF VEHICLES

CROSS REFERENCE TO RELATED APPLICATIONS

This application claims priority to U.S. Provisional Application No. 61/510,380, filed Jul. 21, 2011, and this application also claims priority to U.S. Provisional Application No. 61/527,569, filed Aug. 25, 2011.

FIELD OF THE INVENTION

The embodiments herein relate generally to vehicular fleet management. More specifically, particular embodiments relate to fleet management and driver monitoring and reporting systems, and methods and systems for managing vehicular fleets and monitoring fleet drivers for improving fleet and fleet driver performance.

BACKGROUND OF THE INVENTION

Existing systems and methods in the vehicular fleet management field focus narrowly on specific features of image capture systems and data transmission of files within the image capture systems, rather than on the more broad aspects of fleet management systems and methods. For example, U.S. Pat. No. 7,671,762 to Breslau teaches a system and method of transceiving vehicle data that involves transmission of data from one vehicle to another. Specifically, Breslau involves transmission and reception of vehicle identification data, and vehicular position data, and includes the use of Global Position Sensor (GPS) signals and satellite transmission.

Another existing technology is disclosed in U.S. Pat. No. 6,389,340 to Rayner wherein a circuit is taught that terminates image capture upon occurrence of a triggering event, and in which the system components are housed within a rearview mirror of a vehicle such as a car or truck.

U.S. Pat. No. 7,804,426 to Etcheson teaches a system and method for selective review of event data that comprises computer-assisted cueing of driving data for the selective review in order to save time. Event data is continuously captured and sent to a data buffer, but is sent to an event detector only when requested.

It would be desirable therefore to provide a detailed fleet management system and methods of monitoring and reporting driver and vehicle performance that provide an overall implementation designed to focus on significant safety-related events, and to provide a software server architecture and corresponding web applications providing an interface for efficient user operation.

BRIEF SUMMARY OF THE INVENTION

In accordance with various example embodiments to be described, referred to herein as a fleet management system, trucks, cars, and any other vehicles are configured to collect driver and vehicle event data and to send this information via one or more wireless or other technologies to one or more selected service providers. Servers poll this information periodically, process it, and present multiple methods by which users may view and easily and intuitively analyze the information. The embodiments of the fleet management system permit fleet managers to use this information, received through a report or notification, or pulled directly from a web-based portal, to monitor, correct or reward driver behavior. Administrators having suitable privilege or clearance levels within the organization are presented with a full customizable view into the system for diagnostics, reporting, monitoring, and the like as necessary or desired.

In accordance with one aspect of a system applying principles of the invention, fleet managers or other supervisory users are provided with a way of monitoring drivers and vehicles in a fleet for reporting driver and vehicle performance. The subject fleet management system platform accomplishes these objects and others in a system and method through which a user is able to track vehicle and driver events and distances driven, regardless of how many vehicles have been driven by the target driver.

In accordance with another aspect of a system applying principles of the invention, a user is presented with an interactive, easily-configurable tool to generate reports, receive notifications, and assess driver and vehicle performance in a fleet structure that can be selectively organized by division, region, or any other customizable hierarchy as necessary or desired. The fleet management system platform accomplishes this object in accordance with an example embodiment through a web-based application that provides a portal and user interface, and through efficient data presentation of events. The web-based application allows users to view pages showing vehicle and driver event details, integrated event "snapshots," pre- and post-event videos, maps, and all of the above together in various selectable combinations.

In accordance with another aspect of a system applying principles of the invention, a visual approach is presented that enables easy assessment and scoring of drivers for training and other needs as necessary or desired. The fleet management system platform accomplishes this object through dynamic schemes of organizing and sorting driver and vehicle performance per event type, various customizable driver scorecards, and tables and graphs generated to assist with easily pinpointing areas of potential improvement or optimization.

In accordance with another aspect of a system applying principles of the invention, a method of aggregating data derived from a vehicular fleet for customized driver and vehicle reporting is provided, wherein the method includes accumulating driver and vehicle event data from one or more vehicle-mounted devices configured to capture images from a front of a vehicle and record on-board vehicular data associated with a particular driver and vehicle in a fleet of vehicles, encrypting the driver and vehicle event data, transmitting the driver and vehicle event data to a server that is polled at particular intervals for aggregation in one or more reporting and notification modules, packaging the driver and vehicle event data for presentation to a user via a user interface configured to display the packaged driver and vehicle event data in a form that permits the user to analyze and monitor the particular one or more vehicles and driver's performance, and determining a change for the particular driver and vehicles for improvement and optimization.

In accordance with another aspect of a system applying principles of the invention, a method of managing a vehicular fleet is provided, wherein the method includes installing one or more driver event and vehicle data capture devices in each vehicle in a fleet of vehicles, configuring the one or more driver and vehicle event capture devices in each vehicle to record driver and vehicle event data, and presenting the driver and vehicle event data for a user's customizable analysis of vehicle performance and driver behavior in the fleet of vehicles using a web-based portal and user interface comprised of one or more reporting, analyzing, and notification modules.

In accordance with another aspect of a system applying principles of the invention, a method of monitoring driver safety in a fleet is provided, wherein the method includes forming driver safety metrics from driver event data received in a packaged data format from a server, the driver event data captured from each vehicle in a fleet of vehicles and securely and wirelessly transmitted to a central location for polling by the server, and via a web-based portal and user interface configured to present the driver event data according to a hierarchical structure of vehicles in a fleet of vehicles, reporting the driver safety metrics based on customizable preferences and organization as determined by a fleet manager responsible for one or more drivers of vehicles in the hierarchical structure of vehicles in the fleet, and notifying the fleet manager of severe driver events, the reporting the driver safety metrics and notifying of severe event data permitting the fleet manager to monitor driver safety, performance, and training needs.

In accordance with another aspect of a system applying principles of the invention, a fleet management system includes at least one capture device in each vehicle in a fleet of vehicles configured to record driver and vehicle event data, a driver and vehicle event data encryption and transmission module configure to securely and wirelessly transmit the driver and vehicle event data to at least on service provider, a server configured to poll the at least one service provider for the encrypted driver and vehicle event data and decrypt and package the driver and vehicle event data into a format for analysis by an end user, and one or more reporting and notification modules in a web application having a user interface via a web-based portal and being configured to aggregate the packaged driver and vehicle event data and present the packaged driver and vehicle event in a customizable format to the end user over one or more pages.

In accordance with another aspect of a system applying principles of the invention, a driver and vehicle safety monitoring system is provided wherein the system includes a driver and vehicle event data capture apparatus installed in each vehicle in a fleet of vehicles, the driver and vehicle event data capture apparatus having an image capture module configured to capture images from a camera and an on-board computer connection module configured to record data associated with a driver's operation of the vehicle, a server configured to poll one or more third party service providers for driver event data wirelessly transmitted from the driver and vehicle event data capture apparatus and package the driver and vehicle event data for presentation on one or more web-based portals, and a plurality of customizable reporting and notification modules designed to allow a fleet manager to analyze the driver and vehicle event data and monitor driver and vehicle performance in real time and regardless of which one or more vehicles the driver has driven.

In accordance with another aspect of a system applying principles of the invention, a server architecture supporting a fleet management and driver and vehicle safety monitoring system, is provided wherein the system includes a plurality of connectors for communicating with one or more third party service providers to import driver and vehicle event data comprising a data stream of numeric raw data and video raw data, a decoder service for decoding the driver and vehicle event data into specific, usable data for presentation to an end user, the numeric raw data being parsed into an import service for processing and the video raw data being parsed into a video file service for processing, the video file service storing and indexing video frames received as part of the video raw data, a web application providing a user interface for fleet managers to access reports, schedule notifications, and perform other data analysis functions on driver and vehicle event data, and a database environment comprising a master database for storing fleet and sharding information, a report database for storing processed data on which reports are to be run, and an import state database for storing data needed by the import service for processing.

Other embodiments, features and advantages of the example embodiments will become apparent from the following description of the embodiments, taken together with the accompanying drawings, which illustrate, by way of example, the principles of the example embodiments.

BRIEF DESCRIPTION OF THE SEVERAL VIEWS OF THE DRAWINGS

FIG. 15 shows a list of all events of the selected event type;

FIG. 23 is an example of a Region Report dynamic graphical user interface input screen according to the example embodiment;

FIG. 24 is an example of a Region Report dynamic graphical user interface according to the example embodiment;

FIG. 25 is an example of a Notification dynamic graphical user interface overview screen showing any scheduled notifications, according to the example embodiment;

FIG. 26 is an example of a periodic report dynamic graphical user interface setup summary screen according to the example embodiment;

FIG. 27 is an example of an immediate notification dynamic graphical user interface setup summary screen according to the example embodiment;

FIG. 30 is an example of a Vehicle Management dynamic graphical user interface screen according to the example embodiment;

The accompanying drawings, which are incorporated in and constitute a part of this specification, illustrate several embodiments of the invention and together with the description, serve to explain the principles of the invention.

DETAILED DESCRIPTION OF THE EXAMPLE EMBODIMENT

In the following description of the present invention reference is made to the accompanying figures which form a part thereof, and in which is shown, by way of illustration, exemplary embodiments illustrating the principles of the present invention and how it is practiced. Other embodiments will be utilized to practice the present invention and structural and functional changes will be made thereto without departing from the scope of the present invention.

Figure 1:
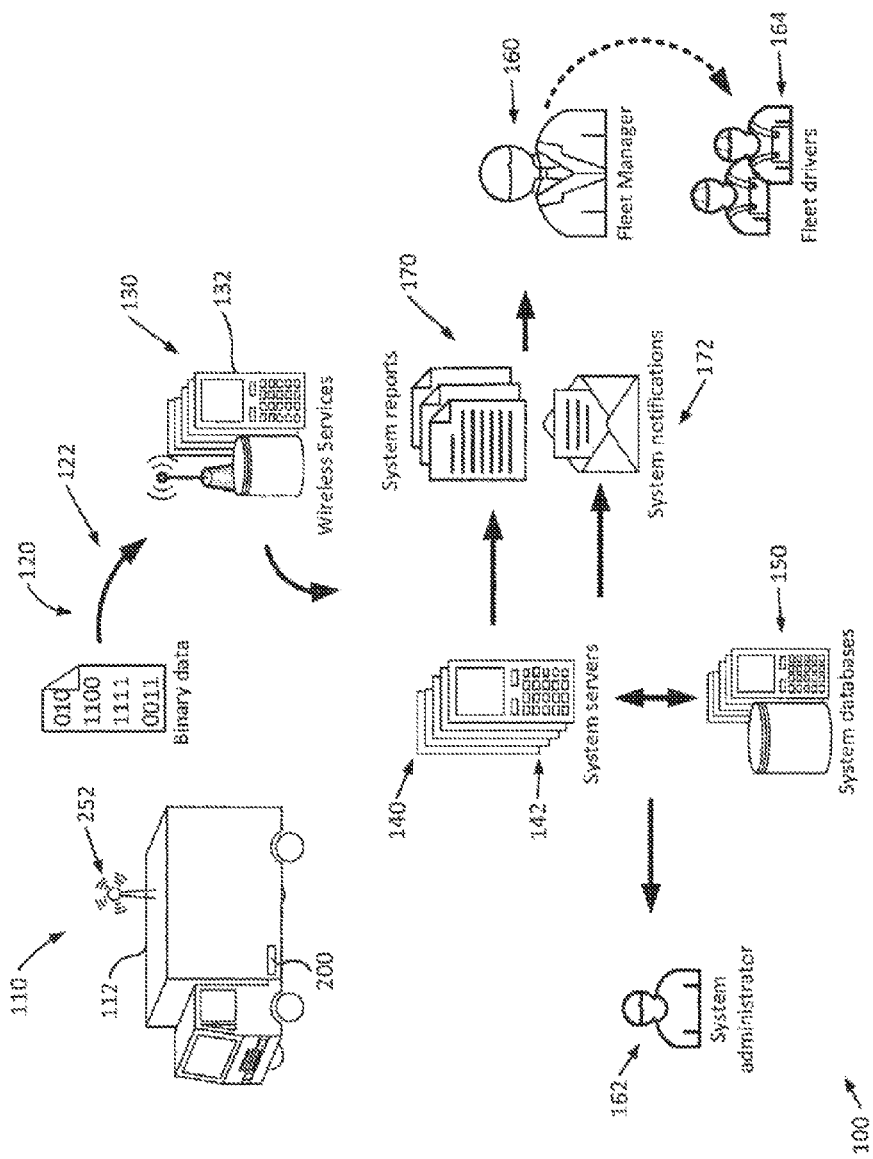
FIG. 1 is a diagram of an overview of the fleet management system and user layout according to the example embodiment.

FIG. 1 is an overview of a fleet management and reporting system 100 in accordance with the example embodiment. In the example embodiment of the present invention, vehicles 110, such as trucks and cars, and particularly fleet vehicles 112, are configured with one or more data collection and reporting devices 200 (FIG. 2) that generate event data such as, in the example of a fleet of trucks, truck start, truck stop, and safety event data, wherein one such system includes for example a Lane Departure Warning (LDW) system 228 (FIG. 2) that generates signals indicative of one or more events and driver and vehicle event data regarding in the example of the fleet of trucks, truck lane wandering or crossing. Additionally, secondary systems to be described in greater detail below with reference to FIG. 2 carried by the vehicles or installed in the vehicle systems such as one or more video cameras, radar, transmission, engine, tire pressure monitoring and braking systems for example may generate additional safety event data. Third-party systems that generate proprietary safety events or data representative of detected safety events may also be involved. For example, the embodiments of the present invention may include software code implementing a Bendix® Wingman® ACB system available from Bendix Commercial Vehicle Systems LLC that captures proprietary safety events and data relating to the proprietary safety events.

These events and event data 120 are, in the example embodiment, selectively sent via one or more wireless networks or wireless links 122 to network servers 132 of one or more service providers 130. Wireless service providers 130 utilize servers 132 (only one shown for ease of illustration) that collect the wireless data 120 provided by the trucks 112. Each also provides a web service by which users can report on or download data.

With continued reference to FIG. 1, one or more servers 140 of the fleet management and reporting system 100 are configured to selectively download or otherwise retrieve data from the collection servers 132 which may be third party servers from one or more various telemetrics suppliers such as for example those available from PeopleNet Communications Corp. or Qualcomm Inc. for example. The one or more servers 140 of the fleet management and reporting system 100 are configured to initiate processing of the vehicular events and vehicular event data in manners to be described in greater detail below. A web application 142 executable on the one or more servers 140 of the fleet management and reporting system 100 includes a dynamic graphical user interface for fleet managers 160 and administrators 162 to view all of the information once it is processed. The subject fleet management and reporting system 100 of the example embodiment also includes one or more databases 150 configured to selectively store all event information provided from the vehicles 112 in the fleet 110 for one or more designated time intervals, including raw and post-processed trip data.

In accordance with the example embodiment, the system administrators 162 are users who are provided with interfaces to configure and manage fleets, monitor platform performance, view alerts issued by the platform, and view raw event data and subsequent processing logs and/or views. Fleet managers 160 may view event information for their respective fleet for internal processing. These events can arrive via user-initiated reports 170 in the web application 142 executable on the one or more servers 140, or via email or other notifications 172. Fleet managers 160 may, depending on internal policies and processes or for other reasons, also interface with individual drivers 164 regarding performance goals, corrections, reports, or coaching.

The subject fleet management and reporting system 100 of the example embodiment therefore offers a long list of functions and features to the end user. All have been designed to be driver centric, so that fleet managers 160 may focus their attention on driver education, training, and performance improvement. One of the primary beneficial and novel uses of the system 100 is the ease of access to driver specific-performance data and the ability to normalize each driver's performance to compare with the drivers of the fleet as a whole in order to pinpoint exemplary drivers for commendation as well as those in need of coaching or other corrective action.

Figure 2:
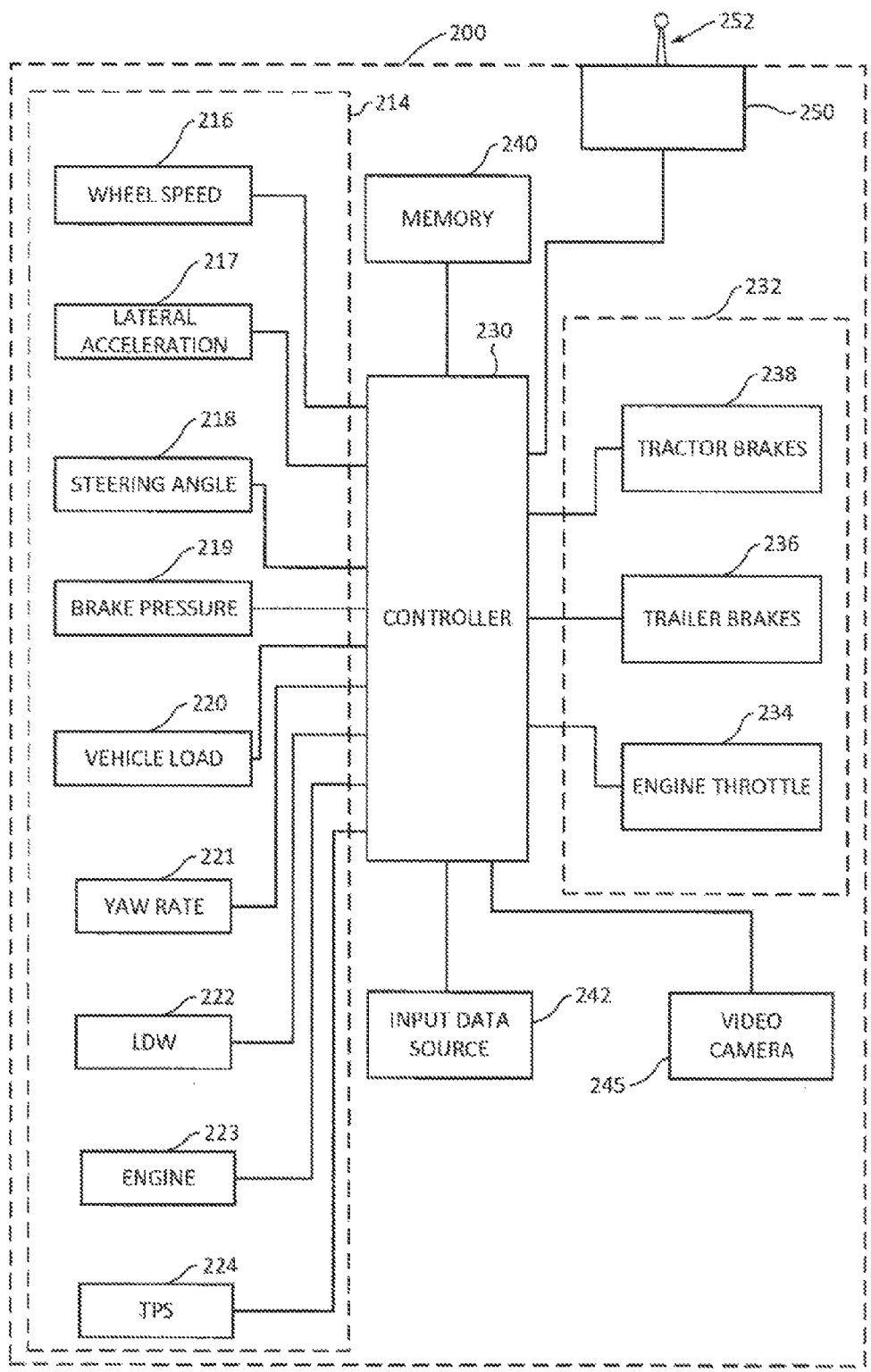
FIG. 2 is a schematic illustration of an exemplary embodiment of a data collection module portion of the subject fleet management system according to the example embodiment.

With reference next to FIG. 2, a schematic representation of a data collection module 200 portion of the subject system for a commercial vehicle 112 (FIG. 1) according to principles of the example embodiment is illustrated. The data collection module 200 may be adapted to detect, monitor, and report a variety of operational parameters and conditions of the commercial vehicle and the driver's interaction therewith, and to selectively intervene and take corrective action as may be needed or desired such as, for example, to maintain vehicle stability. In the exemplary embodiment of FIG. 2, the data collection module 200 may include one or more devices or systems 214 for providing input data indicative of one or more operating parameters or one or more conditions of a commercial vehicle. For example, the devices 214 may be one or more sensors, such as but not limited to, one or more wheel speed sensors 216, a lateral acceleration sensor 217, a steering angle sensor 218, a brake pressure sensor 219, a vehicle load sensor 220, a yaw rate sensor 221, a lane departure warning (LDW) sensor or system 222, one or more engine condition sensors 223, and a tire pressure (TPMS) monitoring system 224. The data collection module 200 may also utilize additional devices or sensors not described in the exemplary embodiment, or combine one or more devices or sensors into a single unit.

The data collection module 200 may also include a logic applying arrangement 230, such as a controller or processor, in communication with the one or more devices or systems 214. The controller 230 may include one or more inputs for receiving input data from the devices or systems 214. The controller 230 may be adapted to process the input data and compare the raw or processed input data to a stored threshold value. The controller 230 may also include one or more outputs for delivering a control signal to one or more vehicle systems 232 based on the comparison. The control signal may instruct the systems 232 to intervene in the operation of the vehicle to initiate corrective action, and then report this corrective action to the wireless service 130 (FIG. 1). For example, the controller 230 may generate and send the control signal to an engine electronic control unit or an actuating device to reduce the engine throttle 234 and slowing the vehicle down. Further, the controller 230 may send the control signal to a vehicle brake system to selectively engage the brakes. In a tractor-trailer arrangement, the controller 230 may engage the brakes on one or more wheels of a trailer portion of the vehicle 236 and the brakes on one or more wheels of a tractor portion of the vehicle 238, and then report this corrective action to the wireless service 130 (FIG. 1). A variety of corrective actions may be possible and multiple corrective actions may be initiated at the same time.

The controller 230 may also include a memory portion 240 for storing and accessing system information, such as for example the system control logic and control tuning. The memory portion 240, however, may be separate from the controller 230. The sensors 214 and controller 230 may be part of a preexisting system or use components of a preexisting system. For example, the Bendix® ABS-6™ Advanced Antilock Brake Controller with ESP® Stability System available from Bendix Commercial Vehicle Systems LLC may be installed on the vehicle. The Bendix ESP system may utilize some or all of the sensors described in FIG. 2. The logic component of the Bendix ESP system resides on the vehicle's antilock brake system electronic control unit, which may be used for the controller 230 of the present invention. Therefore, many of the components to support the data collection module 200 of the present invention may be present in a vehicle equipped with the Bendix ESP system, thus, not requiring the installation of additional components. The data collection module 200, however, may utilize independently installed components if desired.

The data collection module 200 may also include a source of input data 242 indicative of a configuration/condition of a commercial vehicle. The controller 230 may sense or estimate the configuration/condition of the vehicle based on the input data, and may select a control tuning mode or sensitivity based on the vehicle configuration/condition. The controller 230 may compare the operational data received from the sensors or systems 214 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to be applied during corrective action.

A vehicle configuration/condition may refer to a set of characteristics of the vehicle which may influence the vehicle's stability (roll and/or yaw). For example, in a vehicle with a towed portion, the source of input data 242 may communicate the type of towed portion. In tractor-trailer arrangements, the type of trailer being towed by the tractor may influence the vehicle stability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the data collection module 200 may select a tuning that makes the system more sensitive (i.e. intervene earlier than would occur for a single trailer condition). The control tuning may be, for example, specifically defined to optimize the performance of the data collection module for a particular type of trailer being hauled by a particular type of tractor. Thus, the control tuning may be different for the same tractor hauling a single trailer, a double trailer combination, or a triple trailer combination.

The type of load the commercial vehicle is carrying and the location of the center of gravity of the load may also influence vehicle stability. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

In addition, the controller 230 is operatively coupled with one or more video image capture devices shown in the example embodiment as a single video camera 245 representation of one or more physical video cameras disposed on the vehicle 112 (FIG. 1) such as, for example, one video camera on each corner of the vehicle 112.

Still yet further, the data collection module 210 may also include a transmitter module 250 such as, for example, a radio frequency (RF) transmitter including one or more antennas 252 for wireless communication of the one or more various vehicle configuration and/or condition data to one or more destinations such as, for example, to one or more wireless services 130 (FIG. 1) having a corresponding receiver and antenna. The controller 230 is operative to communicate the acquired data to the one or more receivers in a raw data form 120, that is without processing the data, in a processed form such as in a compressed form, in an encrypted form or both as may be necessary or desired. In this regard, the controller 230 may combine selected ones of the vehicle parameter data values into processed data representative of higher level vehicle condition data such as, for example, data from the lateral acceleration sensor 218 may be combined with the data from the steering angle sensor 220 to determine excessive curve speed event data. Other hybrid event data relatable to the vehicle and driver of the vehicle and obtainable from combining one or more selected raw data items form the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, and average ACC usage event data.

Figure 3:
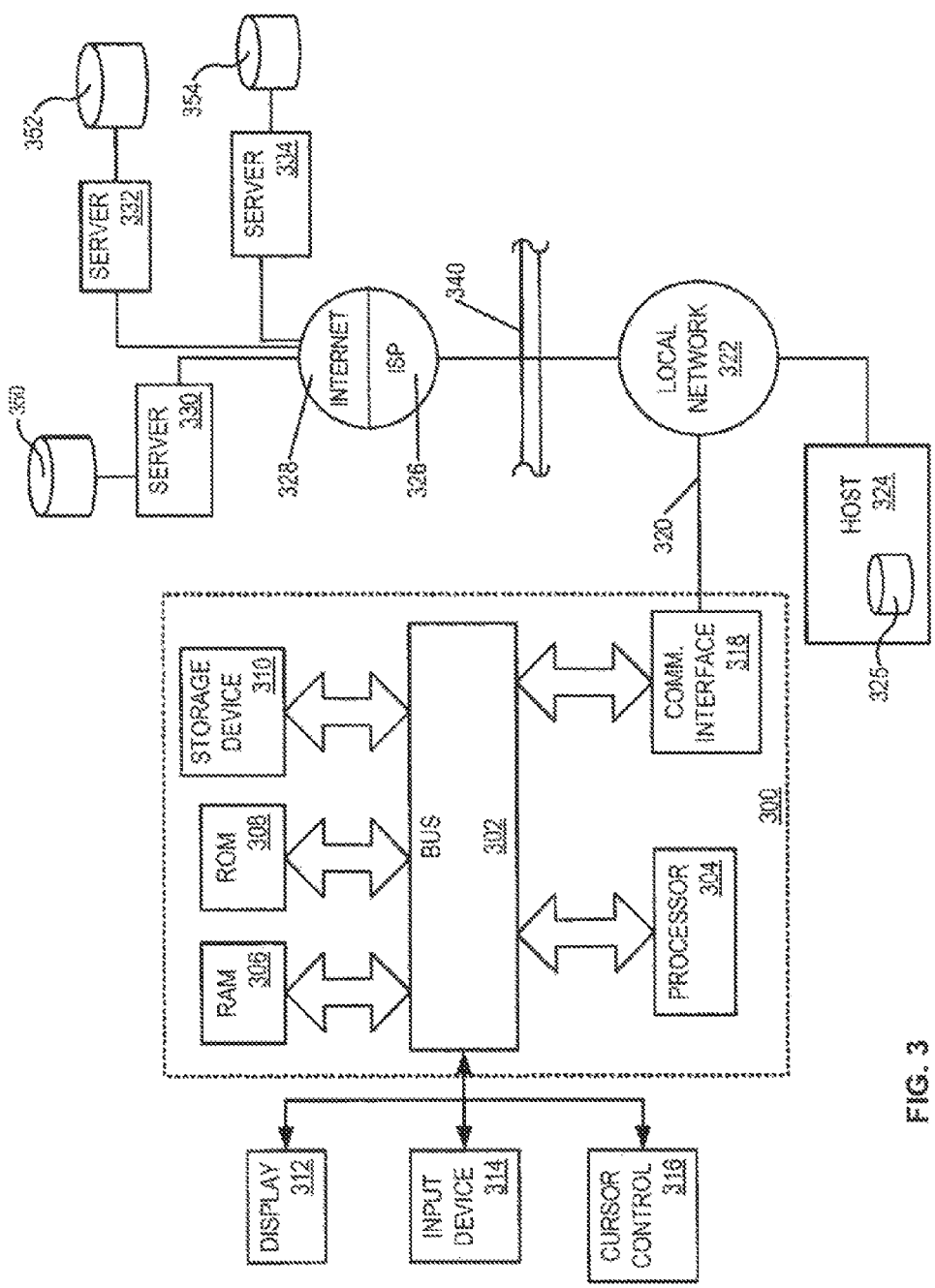
FIG. 3 is a block diagram that illustrates a computer system suitable for executing embodiments of one or more software systems or modules that perform fleet management and methods of monitoring and reporting according to the example embodiment.

FIG. 3 is a block diagram that illustrates a computer system 300 suitable for executing embodiments of one or more software systems or modules that perform fleet management and reporting analyses according to the subject application. The example system includes a bus 302 or other communication mechanism for communicating information, and a processor 304 coupled with the bus for processing information. The computer system includes a main memory, such as random access memory (RAM) 306 or other dynamic storage device for storing information and instructions to be executed by the processor 304, and read only memory (ROM) 308 or other static storage device for storing static information and instructions for the processor 304. A storage device 310 is also suitably provided for storing information and instructions.

The example embodiments described herein are related to the use of the computer system 300 for accessing, aggregating, manipulating and displaying information from multiple remote resources such as, for example, indirectly from multiple fleet vehicles 110 and directly from multiple wireless services 130. Further, the embodiments described herein are related to the use of computer system 300 for accessing information from the multiple sources in selective combination with internal proprietary data such as driver sensitive data, sales, costs, expense records, travel data, and the like from within a firewall 340. According to one implementation, information from the multiple remote public, commercial, and/or internal proprietary resources is provided by computer system 300 in response to the processor 304 executing one or more sequences of one or more instructions contained in main memory 306. Such instructions may be read into main memory 306 from another computer-readable medium, such as storage device 310. Execution of the sequences of instructions contained in main memory 306 causes the processor 304 to perform the process steps described herein. In an alternative implementation, hardwired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 304 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

The computer system 300 includes a communication interface 318 coupled to the bus 302 which provides a two-way data communication coupling to a network link 320 that is connected to local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 supporting a database 325 storing internal proprietary data and/or to data equipment operated by an Internet Service Provider (ISP) 326. ISP 326 in turn provides data communication services through the Internet 328. Local network 322 and Internet 328 both use electric, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet-connected example embodiment, the system 300 is operatively connected with a plurality of external public, private, governmental or commercial servers 330, 332, 334, shown collectively in FIG. 1 as one or more wireless services 130 and server 140 configured to execute a web application in accordance with the example embodiment to be described below in greater detail. In the example embodiment shown, the first server 330 is coupled with a database 350 storing selected data received by a first wireless service such as for example data from a first telematics supplier, the second first server 332 is coupled with a database 352 storing selected data received by a second wireless service such as for example data from a second telematics supplier, and the third server 334 is coupled with a database 354 storing selected proprietary data (shown in FIG. 1 at 140 and 150, respectively) and executable code for performing the web application. The computer system 300 is operative to selectively transmit a request for data to be selectively retrieved from the respective databases 350, 352, 354 through Internet 328, ISP 326, local network 322 and communication interface 318 or to receive selected data pushed from the databases 350, 352, 354, or by both means in accordance with the example embodiments. The received data is processed executed by the processor 304 as it is received, and/or stored in storage device 310, or other non-volatile storage for later processing or data manipulation.

Although computer system 300 is shown in FIG. 3 as being connectable to a set of three (3) servers, 330, 332, and 334, those skilled in the art will recognize that computer system 300 may establish connections to multiple additional servers on Internet 328. Each such server in the example embodiments includes HTTP-based Internet applications, which may provide information to computer system 300 upon request in a manner consistent with the present embodiments.

Selectively locating the proprietary commercial data in database 325 within the firewall 340 is advantageous for numerous reasons including enabling rapid comprehensive local queries without substantial network overhead. However, it is important to maintain the accuracy of the data by performing update or refresh operations on a schedule based on the characteristics of the desired data or on the data requirements of a particular query.

The computer system 300 suitably includes several subsystems or modules to perform the fleet management and driver and vehicle reporting analyses as set forth herein. A primary purpose of the subject application is to provide an improved intuitive and convenient user interface which allows a user to select parameters for performing fleet and driver management and reporting analyses, and to generate intuitive dynamic reports which allow the user to quickly interpret the driver and fleet management and reporting analysis results and to make adjustments of the parameters based on the result presentation as necessary or desired.

Figure 4:
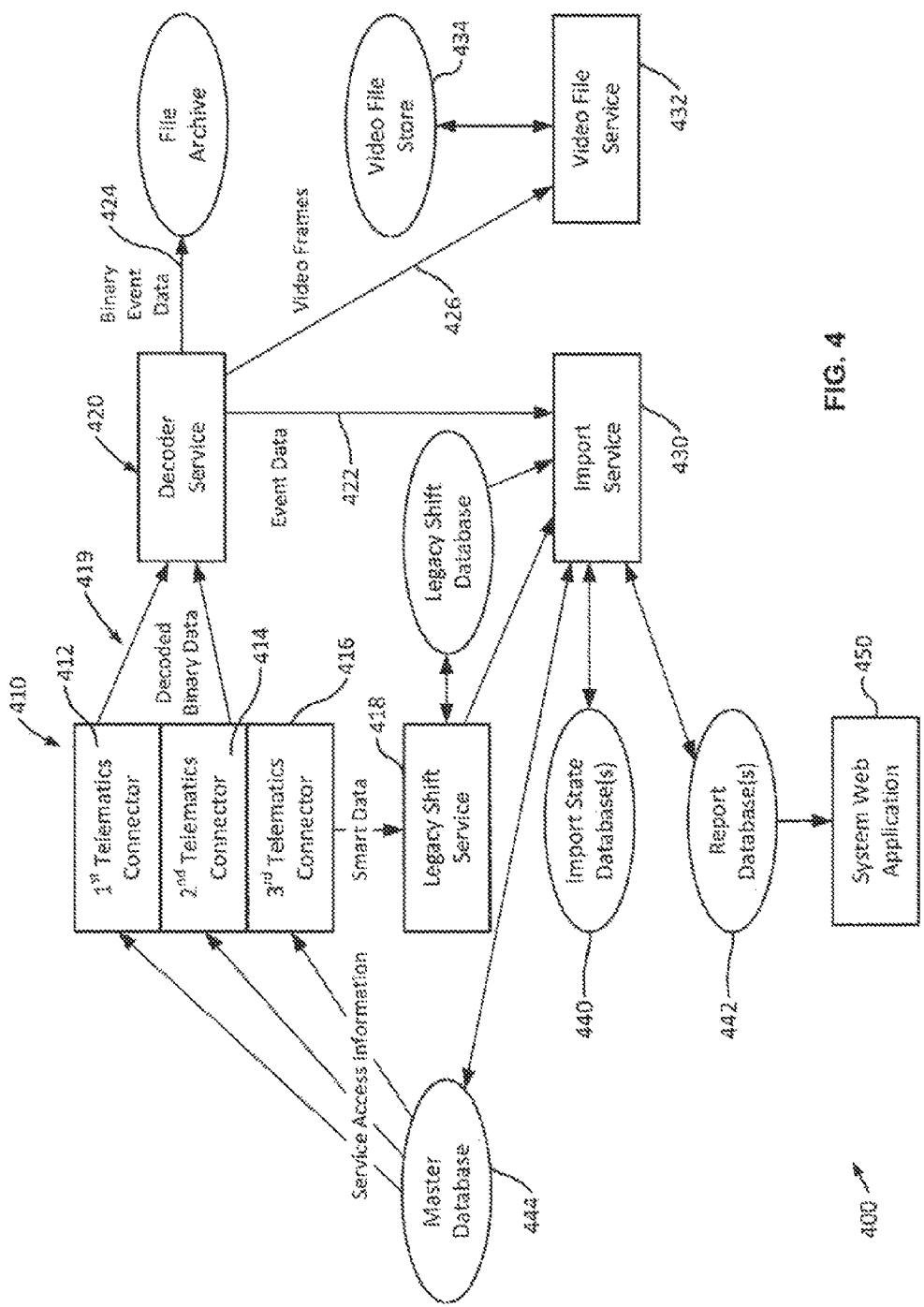
FIG. 4 is an overview of the server software architecture supporting the fleet management system of the example embodiment.
Figure 5:
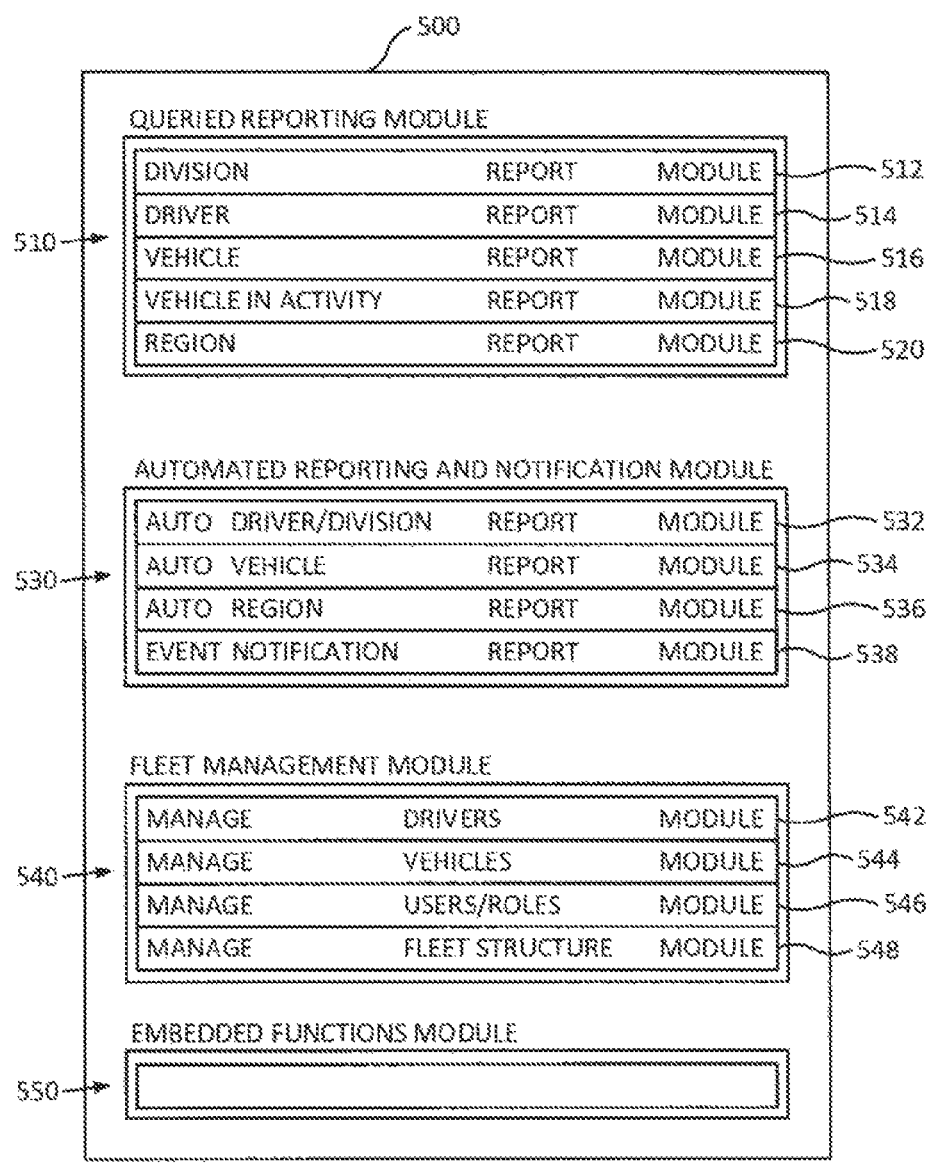
FIG. 5 is a block diagram of components of selected modules of a fleet management and reporting system in accordance with an example embodiment.

FIG. 4 is an overview of the server software architecture 400 supporting the fleet management system of the example embodiment and FIG. 5 illustrates selected modules 500 executed by the computer system 300 as shown in FIG. 3. With reference first to the server software architecture 400, as shown relative to the example embodiment, the architecture utilizes a combination of communication paths including database and WCF connections. WCF allows for data transfer between services without a delay incurred by using a timed service or disk queue. This allows for instant processing of data while reducing overhead incurred in disk or database writes.

The server software architecture 400 utilizes connectors 410, which are timed processes that communicate with one or more third-party telematics suppliers that provide data to the subject fleet management and reporting system 100. These third party telematics services may be provided by, for example, Qualcomm Inc. and PeopleNet Communications Corp. These may be scheduled to run on a timer and may be the primary initiator of the import process.

The first third party telematics connector 412 and the second third party telematics connector 414 may be very similar in function and may be provided to provide redundancy for an assured robustness of the system. They may download any available data from the underlying service, decode this data to binary format 419, and then pass the data to the Decoder Service 420. In this way, advantageously, no further processing is necessary in the connectors. In the example embodiment illustrated, the third party telematics connector 416 is a temporary connector that is operable to download and process shift information and to store the shift information in a Legacy Shift Service 418, such as is available from PeopleNet Communications Corp. for example.

The Decoder Service 420 of the server software architecture is operable to receive the raw binary data flows 419 and to decode the raw binary data flows 419 into event data 422, PPE data 424, or JPEG frame data 426, as appropriate. However, in the example embodiment the function of the Decoder Service 420 is that it receives binary data 419 and is a standalone service rather than a separate process. The software minimizes data sent over satellite or by cellular connections by packaging the data wherein the data is compressed and encrypted on the vehicle computer system. The data is decoded by reversing the packaging operations at the host site.

For event data 422, the Decoder Service 420 passes this data 422 to an Import Service 430 for processing. For the JPEG frame data 426, the individual frames are, in the example embodiment, passed to a Video File Service 432 for storage and indexing in a suitable video file store 434 such as a memory or appropriate database. As a secondary function, the Decoder Service 420 may archive both all binary input 419 and any resultant event data output 422 to an archiving scheme for later analysis or processing. In the event that a re-import from raw data is necessary, the Decoder Service 420 is operable to selectively initiate this action. In this case, the Decoder Service 420 is operable to read the archive information and push through the remaining system as normal.

The Video File Service 432 of the server software architecture 400 is operable to store and index all video frames received from the data stream 419. Each frame is indexed by fleet, vehicle, and timestamp for later retrieval. The Video File Service 432 also provides a means by which the web application of the subject fleet management and reporting system requests video frames for presentation. The request may be by fleet, vehicle, and time range as necessary or desired.

The Legacy Shift Service 418 of the software server architecture 400 is operable to store and process shift information provided by the third telematics connector 416. This service may be decommissioned when the data stream is providing shift data across all stream sources. The Legacy Shift Service 418 is operable to selectively notify the Import Service 430 when a new shift is available so that it can reverse match trip data to shifts.

The Import Service 430 of the server software architecture 400 is the primary service for event processing. In the example embodiment, the Import Service 430 uses a programmatic event model so that it can process many vehicular events simultaneously. In a preferred example embodiment the Import Service 430 processes events sequentially per vehicle, but it is also operable to selectively process multiple vehicles simultaneously. In particular, the Import Service 430 is configured to beneficially consume fairly low overhead while allowing for horizontal scaling as needed. In the example embodiment the Import Service 430 references or otherwise accesses an Import State Database(s) 440 as its primary source of information for processing and producing usable output to the Report Database(s) 442.

The subject fleet management and reporting system 100 of the example embodiment includes a Web Application 450 that is the primary portal for fleet managers and other users to access report data, schedule notifications, and other functions provided by the fleet management and reporting system platform. The Web Application 450 provides the primary interface for accessing vehicle information. In the example embodiment the Web Application 450 provides the only interface, except for email notifications, for accessing vehicle information. The Web Application 450 is also operable to provide administrative screens for setting up new fleets, researching raw data received, and general administrative functions not given to general users such as will be described in greater detail below.

The server software architecture 400 of the example embodiment of the subject fleet management and reporting system 100 therefore includes three main databases: the master database 444, the import data database 440, and the reporting database 442. Each of the databases is optimized for specific uses and has different performance characteristics in accordance with the embodiment. It is possible to run all types on the same physical server. However, in order to obtain optimal performance characteristics it is contemplated that these be placed on different physical machines as usage grows.

In the example embodiment the Master Database 444 contains core information required regarding fleet and sharding information. At a minimum, configuration, sharding, fleet, driver, and vehicle information is stored in the Master Database 444. For all database queries, this information will be replicated to all Report Database(s) 442.

One or more Import State Database(s) 440 provide information to the Import Service 430 as needed. It includes, for example, trip information per fleet per vehicle, events pending processing, and any correctional actions taken to raw data. Being a sharded database in the example embodiment, this database type can be designated per fleet or group of fleets for data isolation, performance purposes, or data SLA requirements. It is to be appreciated that other database types may be used as necessary or desired as well.

One or more Report Database(s) 442 contain processed event data readily available for running reports. Generally, only the Import Service 430 may make modifications to this data, and the primary consumer is the Web Application 450. Being a sharded database, this database type can be designated per fleet or group of fleets for data isolation, performance purposes, or data SLA requirements. Again, however, It is to be appreciated that other database types may be used as necessary or desired as well.

In accordance with the example embodiment illustrated, the Master Database 444 preferably contains at least the following information:
  Base fleet information including name, third party telematics supplier access information, and shard access information;
  Region/division information;
  Fleet driver data;
  Fleet vehicle data;
  User login information;
  Configuration information, such as:
    Diagnostic fault code descriptions;
    Event type details;
    Event type grouping;
    Notifications;
    Time zone algorithms.

In the example embodiment, this information is replicated to the one or more Report database(s) 442 for enhanced speed of access and reporting.

In accordance with the example embodiment illustrated, the one or more Report Database(s) 442 contains the following information:
  Trip data;
  Trip event data;
  PPE data;
  Video Image data;
  TPMS data.

The one or more Import Database(s) 440 include any data required for the import process as necessary. Data is to be stored in an object format such that each vehicle per fleet has its own object hierarchy. While a true ODBMS (object database management system) is preferred, use of any existing or hereinafter developed database technologies is possible to achieve this goal.

Figure 6:
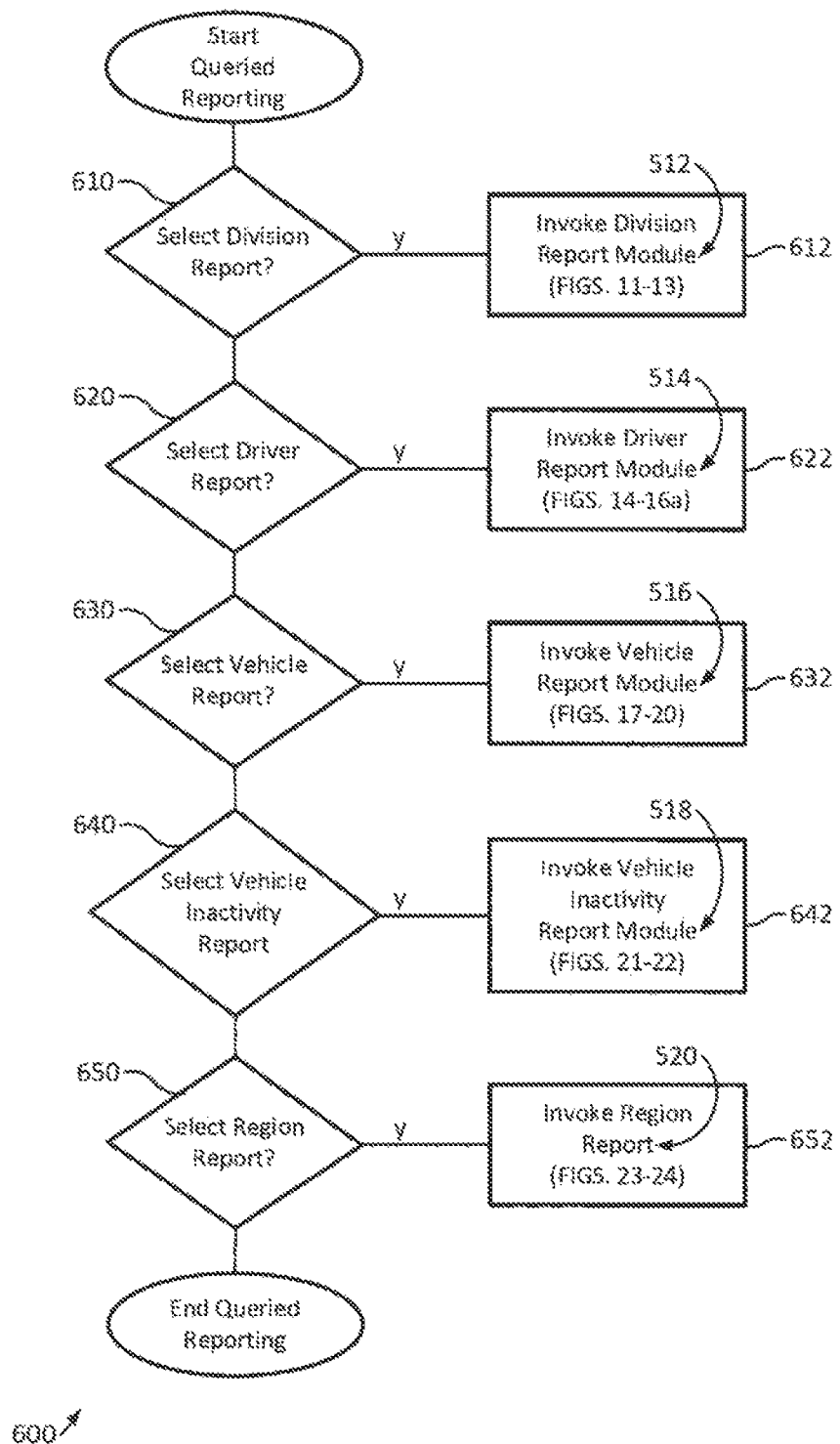
FIG. 6 is a flow chart illustrating a method of generating the queried report dynamic graphical user interface of FIGS. 11-24 in accordance with the example embodiment.

FIG. 5 illustrates selected modules 500 executed by the computer system 300 in the server system architecture 400 of the example embodiment. To that end, the computer system 300 includes a queried reporting module 510, an automated reporting and notification module 530, a fleet management module 540, and an embedded functions module 550 the functions of which will be described in greater detail below. In the example embodiment, the queried reporting module 510 is operable in accordance with the queried reporting method 600 (FIG. 6) and includes a division report sub-module 512, a driver report sub-module 514, a vehicle report sub-module 516, a vehicle inactivity report sub-module 518, and a region report sub-module 520. The automated reporting and notification module 530 is operable in accordance with the automated reporting method 700 (FIG. 7) and includes an automated driver/division report sub-module 532, an automated vehicle report sub-module 534, an automated region report sub-module 536, and an automated event notification report sub-module 538. Lastly, the fleet management module 540 includes a manage drivers sub-module 542, a manage vehicles sub-module 544, a manage users and roles sub-module 546, and a manage fleet structure sub-module 548. Collectively the modules 500 are configured in accordance with the example embodiment to present information on the display 312 in unique multiple frames including in a dashboard format which uses information retrieved from the one or more databases in accordance with one or more search queries, and displays the information in one or more frames in one or more intuitive formats that are easy to understand such as for example, in graphical, chart, map, or other form. The dashboard functionality selectively separates a display screen into multiple frames to display information from multiple sources such as, for example, from one or more of the external databases, from the internal database 325, or from selected combinations of the external databases and the internal database The queried reporting method 600 in accordance with the example embodiment is illustrated in FIG. 6 and includes a selection 610 of a division report sub-module 512 executed at 612, a selection 620 of a driver report sub-module 514 executed at 622, a selection 630 of vehicle report sub-module 516 executed at 632, a selection 640 of a vehicle inactivity report sub-module 518 executed at 642, and a selection 650 of a region report sub-module 520 executed at 652. The details of the queried reports and queried reporting modules will be described below in greater detail.

Figure 7:
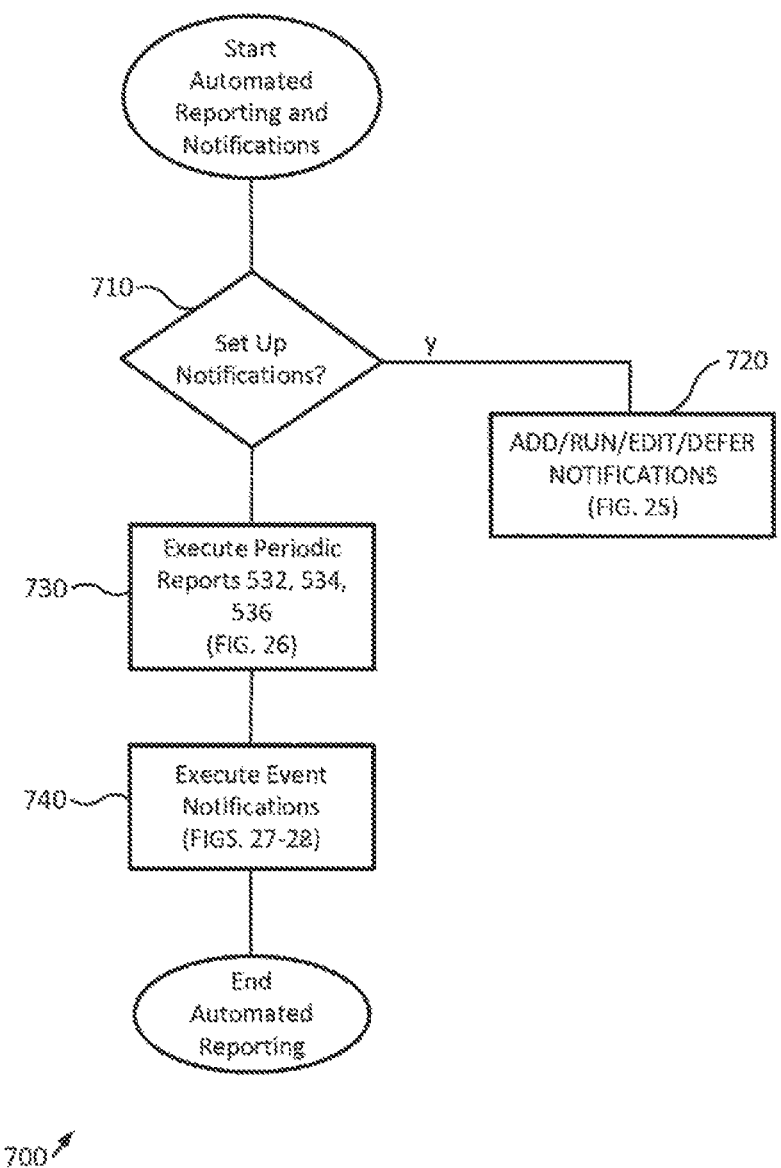
FIG. 7 is a flow chart illustrating a method of generating the automated report dynamic graphical user interface of FIGS. 25-28 in accordance with the example embodiment.

Similarly, the automated reporting method 700 in accordance with the example embodiment is illustrated in FIG. 7 and includes a selection at 710 of a notifications set up module executed at 720. If the notifications set up module is not selected the method executes a set of periodic reports at 730 and further executes a set of event notifications at 740. The details of the automated reports and notifications and automated reporting and notification modules will be described below in greater detail.

Figure 8:
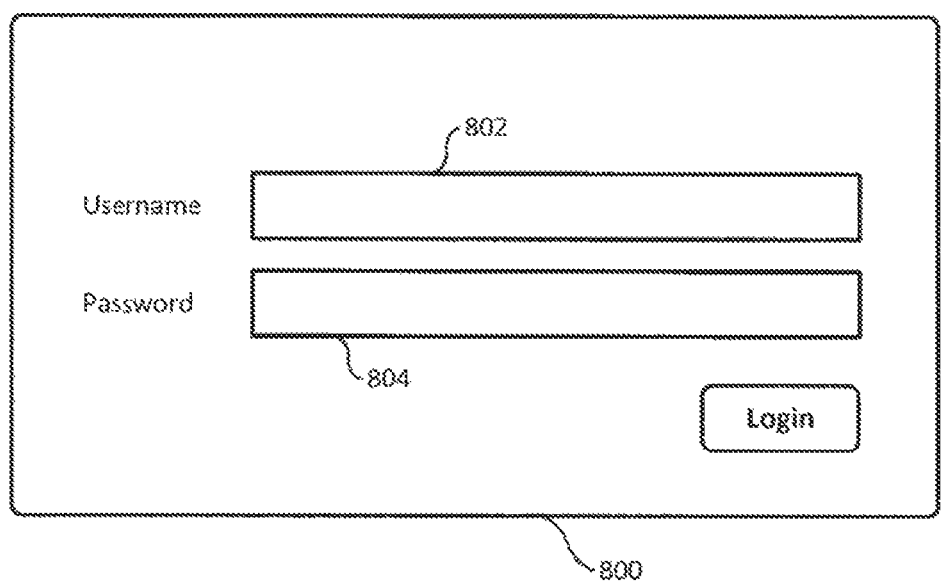
FIG. 8 shows a main login page of a dynamic graphical user interface web application for end users such as fleet managers and administrators according to the example embodiment.

In accordance with the example embodiment the web application 450 is a user interface that includes, as its home screen, a main graphical user interface login page 800 for end users such as fleet managers 160 (FIG. 1) and administrators 162 (FIG. 1), as shown in FIG. 8. In accordance with the example embodiment, each fleet is assigned a master administration login once registered with the subject fleet management and reporting system 100. The login page 800 allows a user to enter his or her login in a user name field 802 and password in a password field 804 to gain access to the features of the web application 450 of the fleet management and reporting system 100 to which access is permitted based on his or her role. The main login page 800 may also include links (not shown) to other sites, such as an organizational main link, a contact us link, and link to allow a potential user to request a login and password to begin using the system for the first time, or where one's login and password cannot be remembered.

Figure 9:
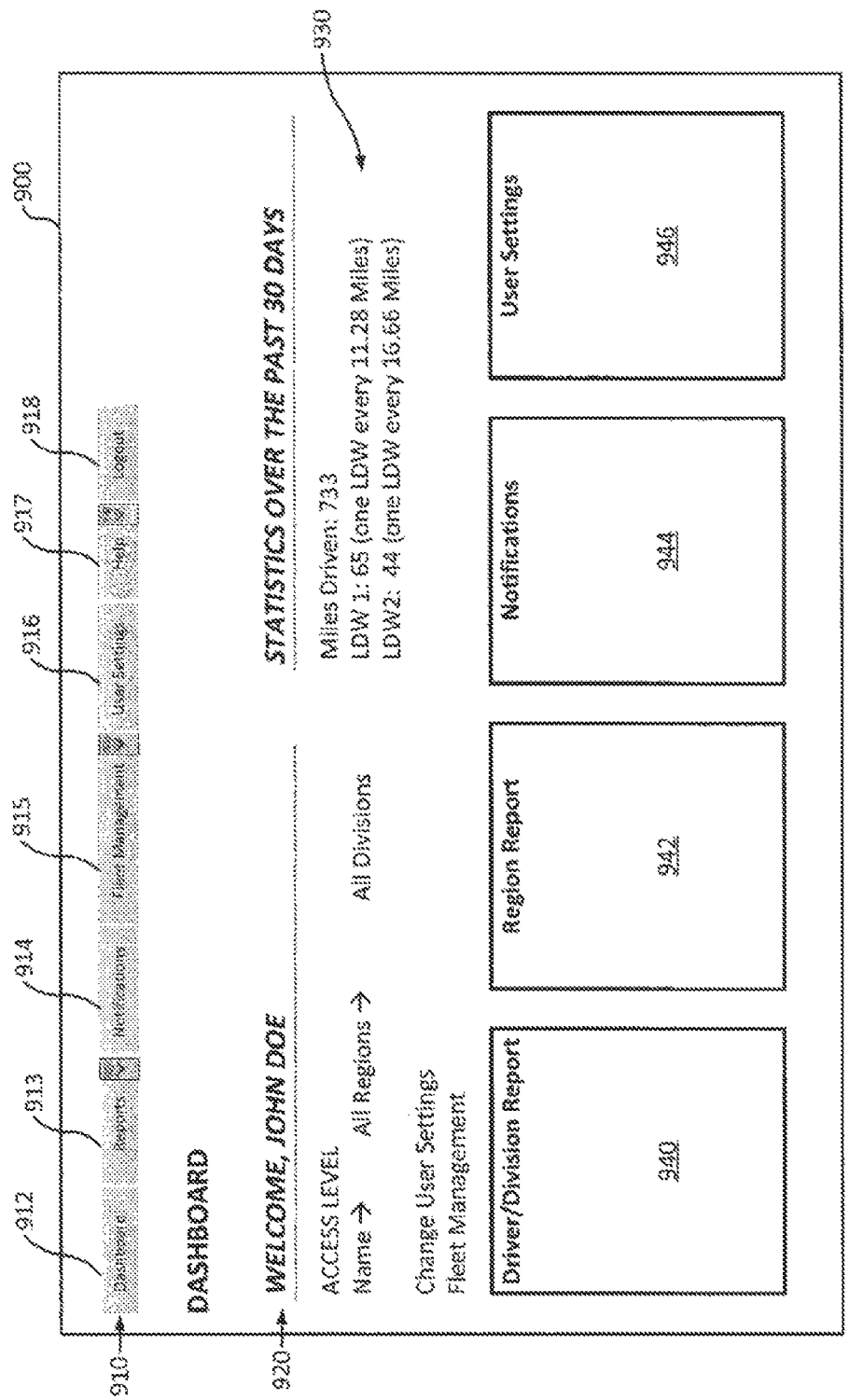
FIG. 9 shows a main dashboard of the dynamic graphical user interface web application according to the example embodiment.

Once a user has entered login information in the main login page 800 of FIG. 8 and logged in to the web application 450 of the fleet management and reporting system 100, a Dashboard 900 is displayed such as shown in FIG. 9 for example. This Dashboard 900 graphical user interface functions as a main hub for users to access and utilize all information and available tasks in the web application 450.

The Dashboard screen 900 may always be accessed from throughout the web application 450 by clicking the Dashboard tab 912 in the menu bar 910 on top of any graphical user interface page. One main feature of the Dashboard graphical user interface page 900 is that it provides direct access links to the different reporting tools and customization tools available within the subject system. It also displays key user information 920 for the logged-in user, such as name, organizational access level (see discussion of fleet structure below), etc. There is also a section of the Dashboard screen 930 showing the current LDW statistics for the fleet or sub-organization, as a snapshot, for example, of the last 30 days' performance. Information may also be presented to the user in graphical form, such as for example snapshots of driver or division reports 940, region reports 942, notifications 944, and user settings 946.

The layout of the main Dashboard screen 900 may be dynamically adjusted according to the access level of the current user. For example, if the user only has access rights to a particular division (organizational home is a division) the menu option for Region Report 942 will be inaccessible. However, if the user is a fleet administrator, a menu option for fleet management will be available.

The main Dashboard graphical user interface screen 900 may also include a number of links to other sites. Among these may be a link for help 917 and to view or change user settings 916. Still other links may allow users to adjust or view information for reports 913, notifications 914, and fleet management 915. Another link 918 may allow a user to log out of the web application. These types of links 912-918 may also be present throughout the web application so that they may be accessible from any page.

Figure 10:
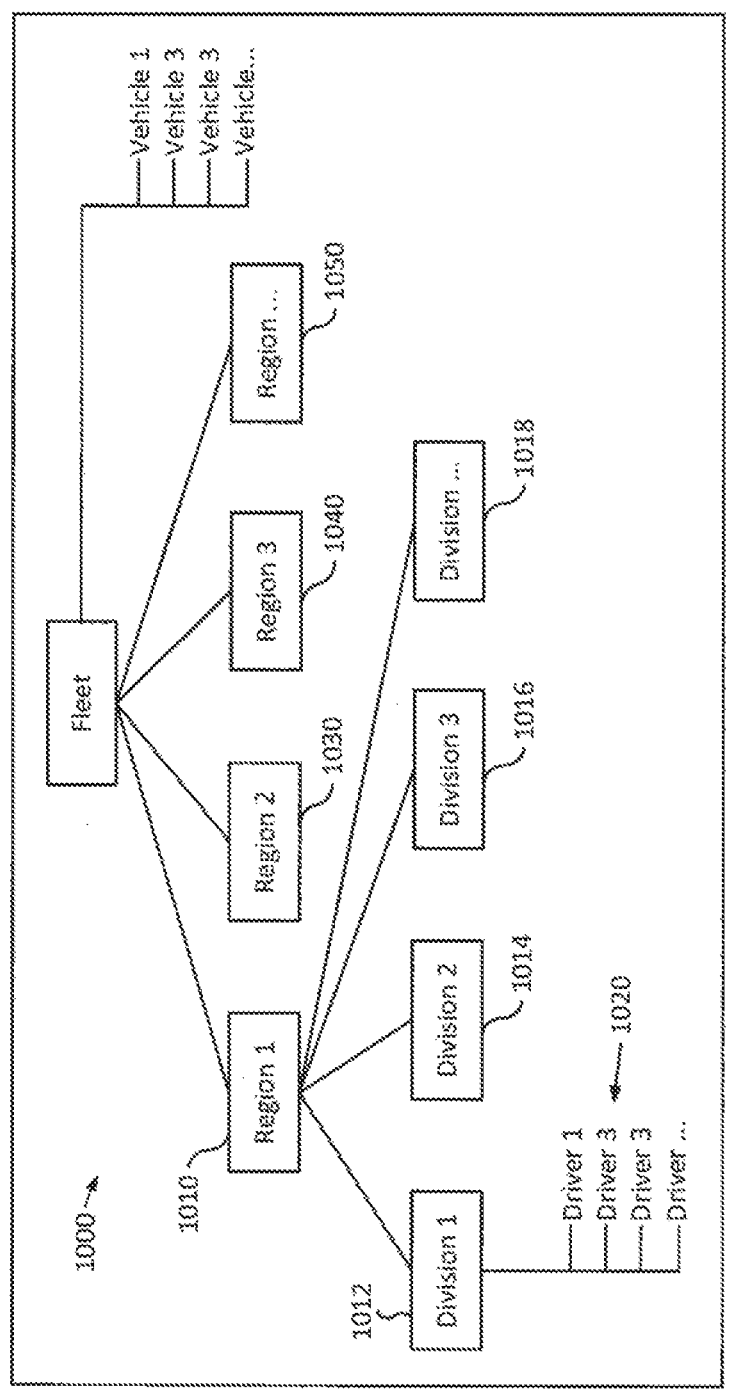
FIG. 10 shows a generic fleet structure depicting a fleet in different organizational levels as a base for data access according to the example embodiment.

One beneficial advantage of the system in accordance with the example embodiment is that it is functional to allow users to structure a fleet in different organizational levels. This structure provides the basis for data access, wherein an example of a fleet generic organizational structure 1000 is defined as depicted in FIG. 10. Further in accordance with the example embodiment, fleets may be structured generally so as to allow driver-centric reporting, vehicle-centric reporting, or both.

In addition to the above, the selected or otherwise user constructed fleet structure 1000 is used by the subject system to grant access rights to users. When a new user is defined, that user will be assigned an organizational home, e.g. a Region. A user will have access to all data connected to the User's organizational home.

For example, a user may be a regional manager for Region 1 1010. When this user is registered in the system he/she will be assigned to Region 1, and this user will now have access to data from all divisions 1012-1018 reporting to Region 1 1010. When this user queries the fleet system for a division report, the user can select all divisions and drivers 1020 under this region, but not any divisions reporting to region 2 1030, 3 1040, etc. 1050.

If the fleet only has one level of divisions/regions/terminals or similar, the subject fleet management system 100 uses the division level to define locations, as drivers are tied to divisions. In this case define one region as the only company region.

With reference again to FIG. 9, the user may select the Reports tab 913 to initiate the queried reporting module 510 (FIG. 5) to execute the queried reporting method 600 of FIG. 6. By selecting 610 a Division Report, the Division Report module 512 is invoked at step 612, wherein a Division Report graphical user interface 1100 (FIG. 11) is configured to provide a scorecard 1202 (FIG. 12) showing the performance of all individual drivers in the selected division as well as a division average. The report is based on division level driver data, and is used to display driver performance individually or for the whole division. In accordance with the example embodiment, all data is reported for individual drivers.

Figure 11:
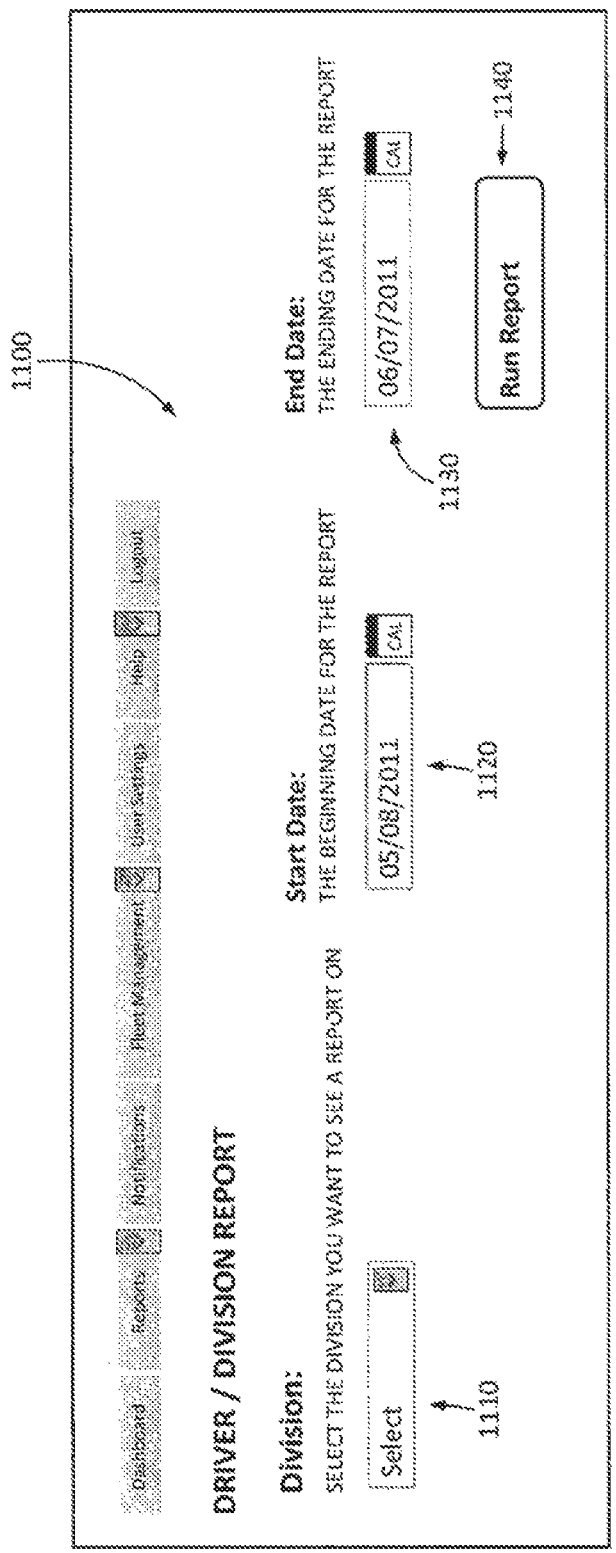
FIG. 11 shows a Driver/Division Report dynamic graphical user interface input screen according to the example embodiment.

FIG. 11 shows a representation of the Driver/Division Report graphical user input screen 1100 of the web application 450. Clicking the quick link or menu item for Driver & Division Report 940 from the Dashboard 900 (or any other page in the subject fleet system on which such a link or menu item appears) brings up the input screen depicted in FIG. 11. To create a report, the user performs the following steps:

1) Select a Division at 1110 to work with. The list of divisions is customized based on the user's access level. A division manager may only be presented with his/her division, whereas a region manager will be presented with all divisions reporting to that region;
2) Choose at 1120 and 1130, respectively, a start and end date for the report. This will define what data set to display. The default is the last i.e. previous month; and
3) Click at 1140 the 'Run Report' link or button.

Figure 12:
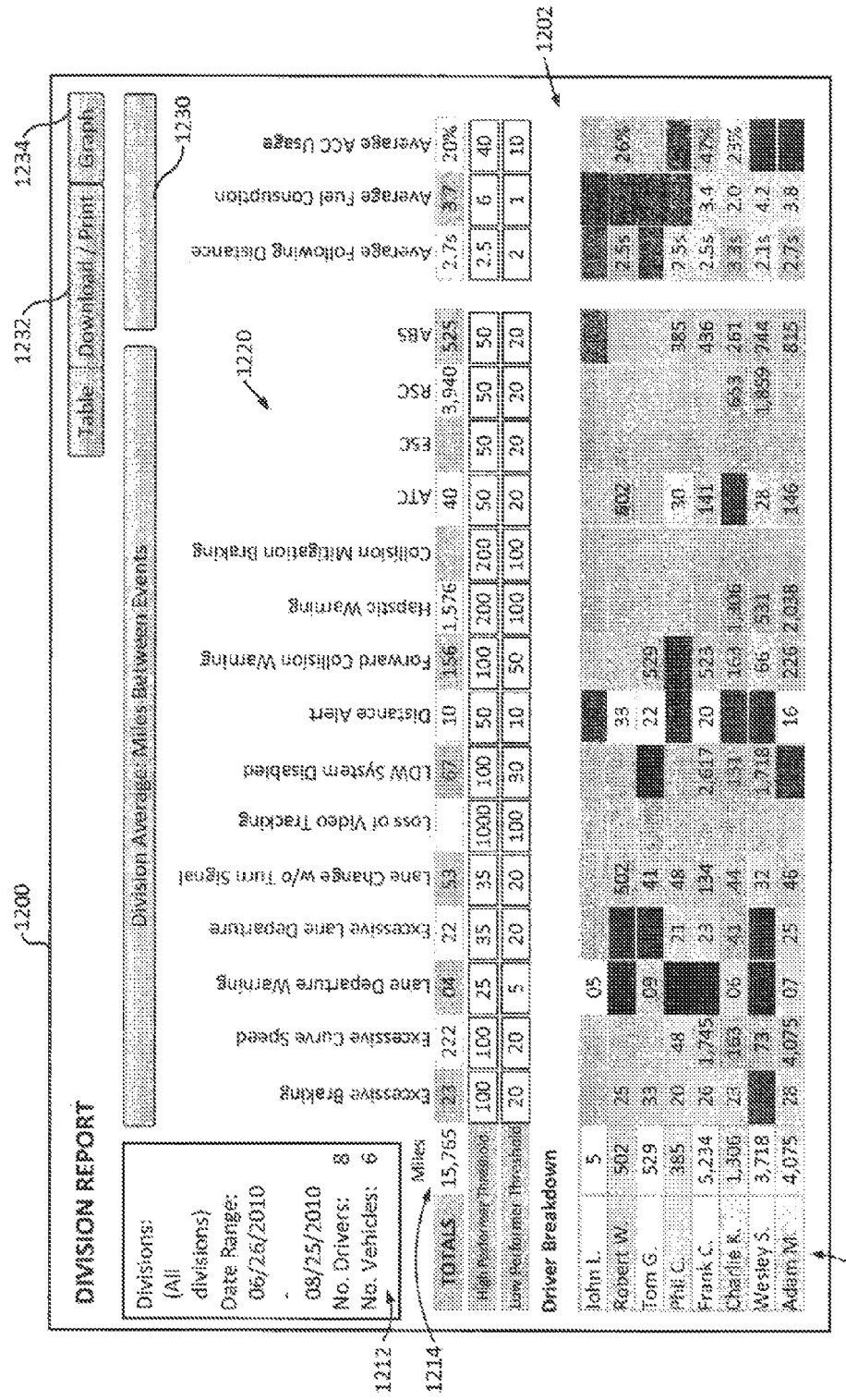
FIG. 12 shows an example of a Division Report dynamic graphical user interface according to the example embodiment.

The Division Report 1200, an example of which is shown in FIG. 12, displays a list of all drivers 1210 who have logged miles for the division during the selected time period. It also shows the number of fleet vehicles driven 1212 and total miles logged 1214. The Division Report presents information to the user in many ways, such as a scheme that sorts driver performance per type of event 1220, so that information may be used to evaluate driver and vehicle performance.

For example, the Division Report 1200 may utilize a scoring feature that allows a user to easily ascertain each driver's performance. A score for each event may be displayed in the form of a driver scorecard, as average miles between events, which is a normalized score that can be compared between drivers, regardless of the amount of miles driven by each driver. The Division Report also displays the fleet average by event type.

The Division Report 1220 may include a Toggle Highlighting feature. By selecting the 'Toggle highlighting' option via a link or button 1230 on the Division Report page, each driver's performance is rated and represented relative to the other drivers in the pool or fleet for example using a Green/Yellow/Red color scheme, based on High/Low Performer Thresholds selectable by each user. For example, the higher the number of events per number of miles receive red (alert) marks, however, the color coding is dynamically changeable by the user. More particularly, although in the example embodiment each driver's performance is rated and represented relative to the other drivers in the pool or fleet using a Green/Yellow/Red color scheme, other visual indicia maybe used as well for differentiating the relative performance ratings between the drivers such as for example different cross-hatching patterns, flashing or blinking displays, or a re-sorting of the list of drivers in the table based on a selected parameter column. Once a High/Low Performer Threshold value has been changed by the user this value will be saved to the next time the user uses this tool. Information may also be sorted by best or worst performer per event type, by clicking the sort buttons above each data column. Reporting is therefore highly customizable by the user. Yet still further, the performance of each driver may be compared against one or more threshold values set by a system user wherein the relative performance of the other drivers has no impact on the assessment of the driver of focus.

The Division Report 1220 may also include a download feature and a print feature. By activating such as by clicking on the Download/Print link or button 1232, for example as shown in the upper right corner of FIG. 12, the report will be displayed in a printer-friendly format. It also gives the user the option of exporting the report many different formats, such as XML, CSV (comma Separated Values), Acrobat .pdf, HTML, Excel, TIFF (image file), and MS Word.

Figure 13:
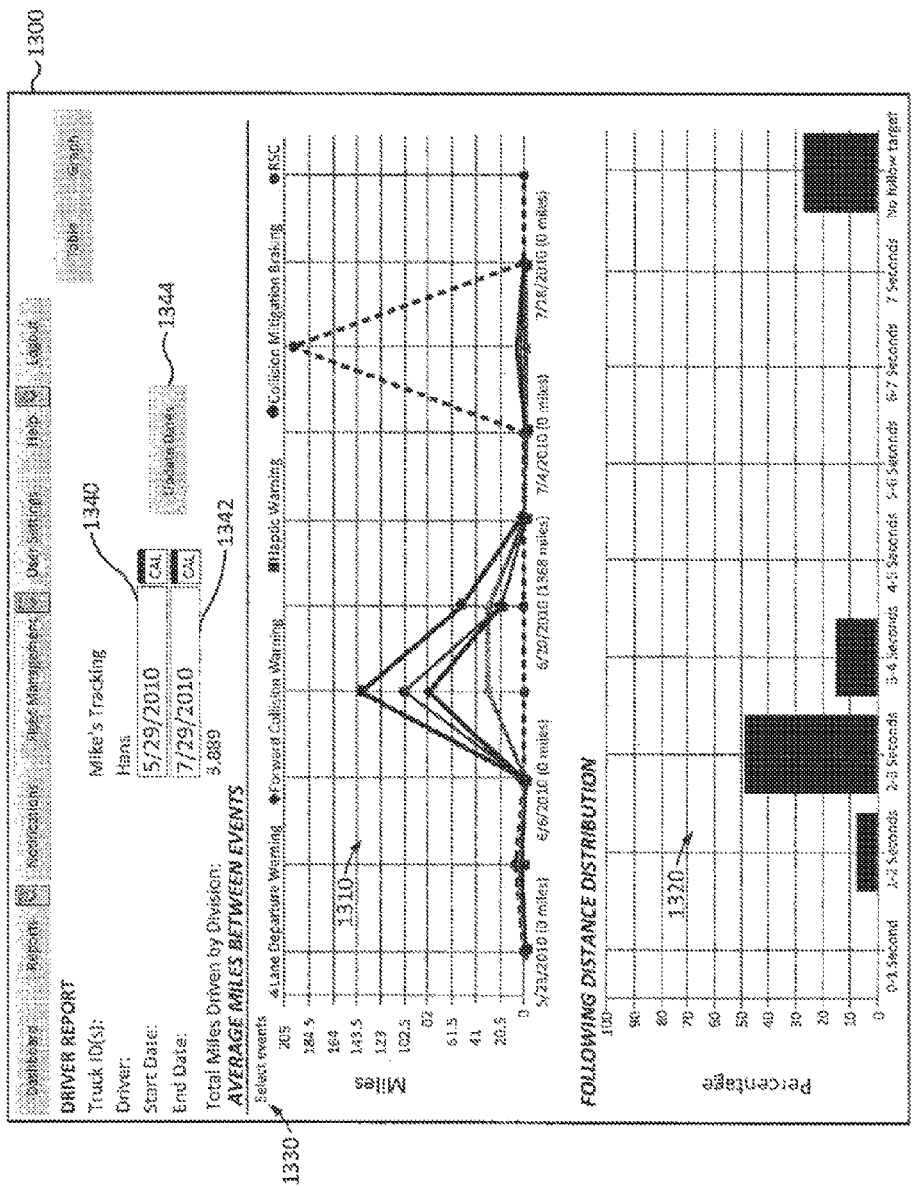
FIG. 13 shows a dynamic graphical user interface example of a selected Division's or Driver's performance in graphical form.

By clicking a 'Graph' link or button 1234 that may also be included on the Division Report page, a graph function is activated. This graph function allows the user to present the selected Division's or Driver's performance in graphical form 1310, as shown for example in FIG. 13. In FIG. 13, performance is displayed as average miles between events for each calendar week of the selected date range.

Also shown in FIG. 13 is a following distance distribution shown as a histogram 1320. The present invention therefore provides different ways of evaluating driver performance and presenting to users of the fleet management and reporting system. In this example, the FIG. 13 displays an interactive representation of tracking average following distance and creating a histogram of following distance performance.

Selecting 'Select Events' tab 1330 in the graphical user interface of FIG. 13 displays a list of all event types. By checking the box in front of an event and selecting 'Redraw' that event type will be added to the graph. Unchecking a box will remove that event type from the graph.

This view also includes a tool for changing the date range of the report. By selecting a different start date 1340 and/or end date 1342 and clicking 'Update Dates' 1344, the date range will update. The new date range will also apply to the Table view of the report.

Figure 14:
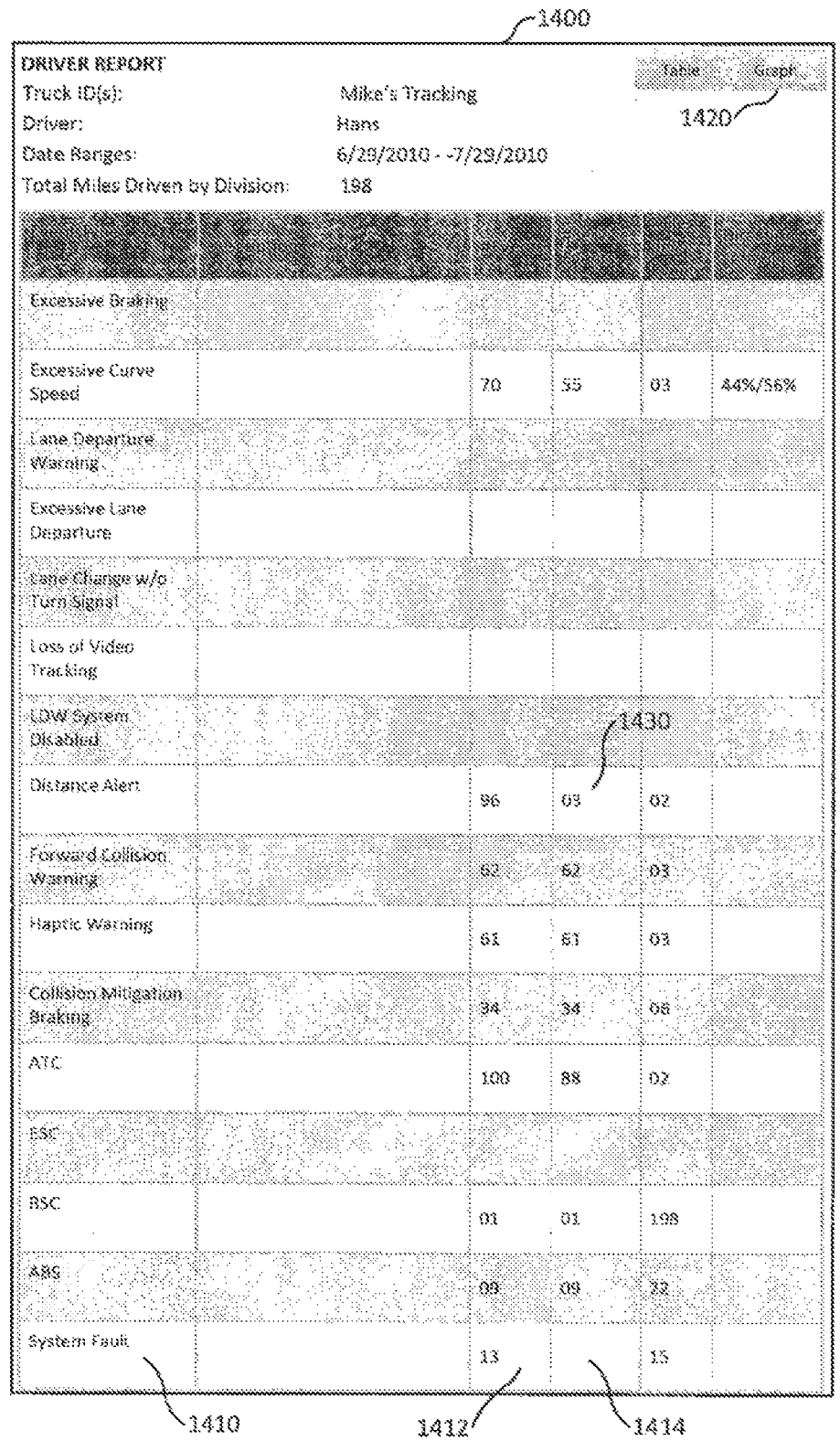
FIG. 14 shows a dynamic graphical user interface example of a Driver Report according to the example embodiment.

The subject system is also capable of generating a Driver Report that may be used to find and display detailed data about an individual driver's performance. This can be displayed in data form or graphical form. With reference again to FIG. 9, the user may select the Reports tab 913 to initiate the queried reporting module 510 (FIG. 5) to execute the queried reporting method 600 of FIG. 6. By selecting 620 a Driver Report, the Driver Report module 514 is invoked at step 622, wherein a Data Presentation graphical user interface 1400, as shown in of FIG. 14 is presented to the user.

The Driver Report 1400 displays a list of vehicles the driver has driven over the selected time period and the total amount of miles driven. It also displays a list of all driver and vehicle event types 1410 and a brief explanation of each event type. For each event type the total number of events 1412 is displayed as well as a score 1414 defined by the average amount of miles between each occurrence of the event. By clicking the 'Graph' link or button 1420 on the Driver Report a graph function is activated that presents the selected driver's performance to the user in graphical form, in the same manner as can be performed for the Division Report.

By clicking on the 'View' link or button next to an event type score 1430, a new screen 1500 is presented, showing a list of all events of the selected event type, as shown for example in FIG. 15. This list summarizes all events of the selected type over the time period chosen. Selection of one of the headers by clicking on it (for example, 'Odometer') sorts the event list by that field. If there are more events than fit on one page a selectable list of pages will be displayed, for example at the bottom left of the page.

Figure 16A:
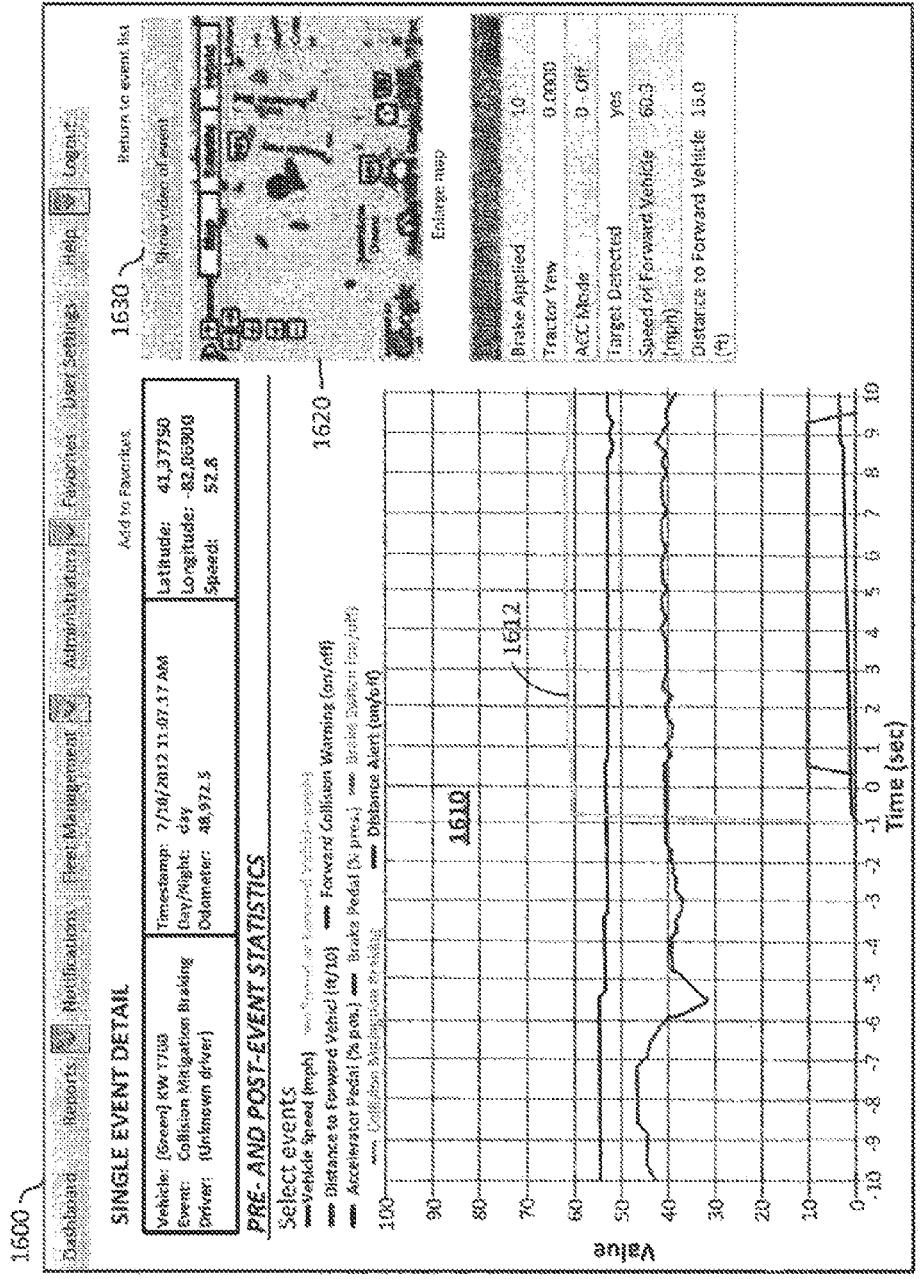
FIG. 16A shows an example of a Single Event Detail dynamic graphical user interface page after selecting an event in the event summary list.

FIG. 16A is a sample graphical user interface page 1600 with Single Event Detail shown. By clicking on 'Details/Map Event' 1510 of an event in the event summary list 1520, a detail and location page will be displayed for that event, as for example in FIG. 16A. This page displays in a graphical user interface 1610 all details about the event together with a map view 1620 showing the location (note that this is available if GPS information is available in the vehicle) of the vehicle when the event was recorded. If the event was severe, the event report will also display ten seconds of data before and after the event in a graphical form. By clicking 'Select Events' 1630 the user may select which signals to plot in the graph 1612. Hovering over a line in the graph will show a description of the signal as well as the current value.

The Driver Report 1400-1600 can also be used to view video captured by the subject fleet system. Functions of the system may include the option of recording video with severe events. When this function is operative, video is recorded and transferred covering, for example, five seconds of video before and five seconds after severe events of selected type (default types are Excessive Braking, Excessive Turn, Haptic Warning and Collision Mitigation Braking).

Videos are recorded by the Lane Departure Warning (LDW) camera at an exemplar frame rate of five frames per second. Video may take longer to transfer than data, due to the amount of data required. Depending on mode of communication and reception, video transfer may take several hours to complete, but typically happens within 20-30 minutes of the event during normal operating conditions.

Figure 16B:
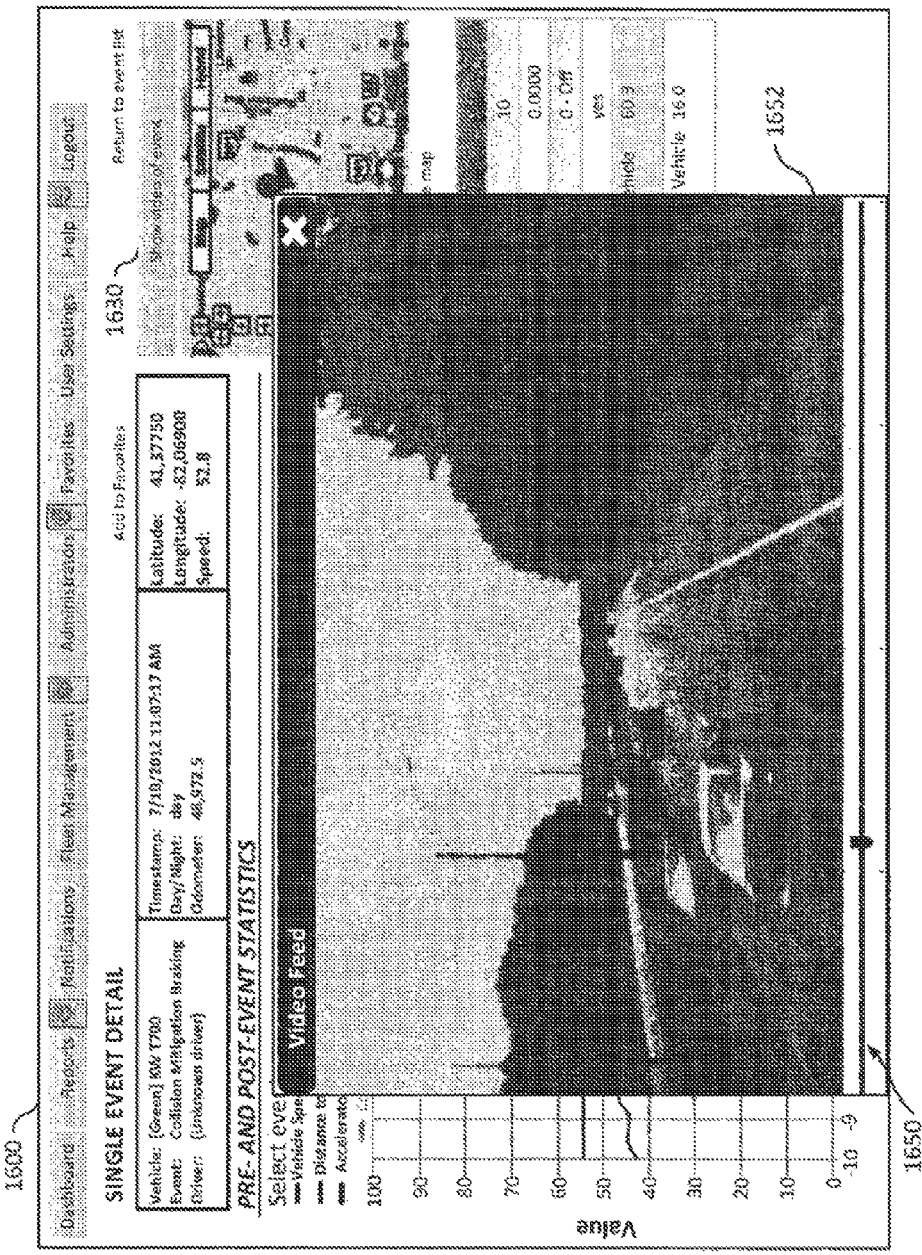
FIG. 16B shows the Single Event Detail dynamic graphical user interface page if FIG. 16A with a video screen as an overlay showing video of an area adjacent the vehicle captured at times surrounding a detected critical event.

For events where video is available, the subject system may include an additional button 1630 or link in the Single Event Detail screen, with a name indicating 'Show video of event' or similar. Selecting this link or button opens an integrated video player 1650 as an overlay 1652 directly in the detail page 1600 shown for example in FIG. 16B. In accordance with this example embodiment, the user's computer is provided with or is otherwise Flash plug-in enabled to be able to view video clips. In this way, users of the subject fleet system 100 may review video recorded of the operating conditions and environmental situations such as traffic conditions at times prior to, during, and after the occurrence of severe events as determined from suitable analysis of the event data collected. As an example, a following distance critical event may be deduced from information collected from the Automated Cruise Control (ACC) system in combination collected from the forward collision warning system.

In addition to presenting information to users about driver-specific events and performance, the subject fleet management and reporting system is operable to selectively generate information about specific vehicles. With reference again to FIG. 9, the user may select the Reports tab 913 to initiate the queried reporting module 510 (FIG. 5) to execute the queried reporting method 600 of FIG. 6. By selecting 630 a Vehicle Report, the Vehicle Report module 516 is invoked at step 632, wherein reports on vehicle-specific information for the complete fleet can be initiated. Selecting a menu item for Vehicle Report generates the Vehicle Report graphical user interface input screen 1700 as depicted in FIG. 17.

To create a Vehicle Report, the following steps are done:
1) Choose at 1710 a start date and at 1720 an end date for the Vehicle Report. This will define or select the data set to display. The default is the last month; and
2) Click the 'Run Report' link or button 1730.

Figures 17, 18:
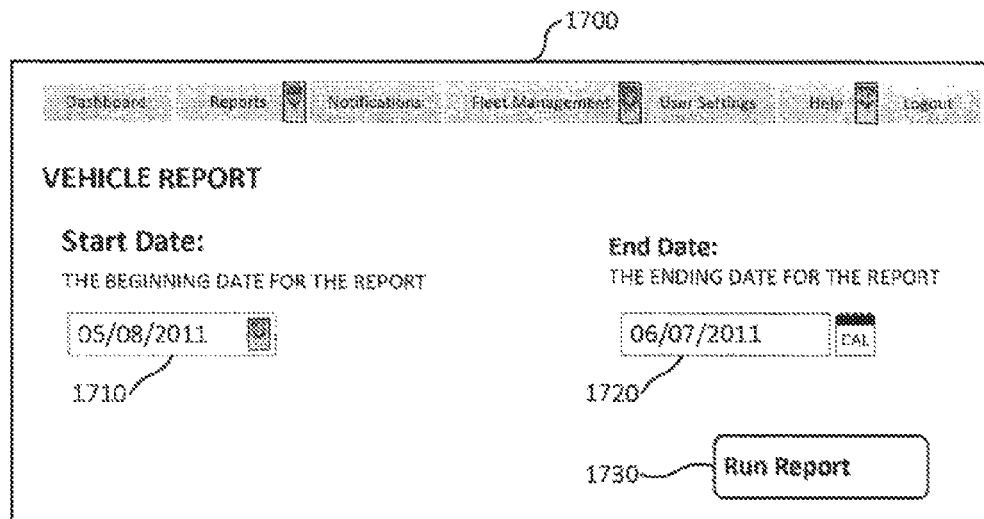
FIG. 17 is an example of a Vehicle Report dynamic graphical user interface input screen according to the example embodiment.
FIG. 18 is an example of a Vehicle Report dynamic graphical user interface summary screen according to the example embodiment.
Figure 19:
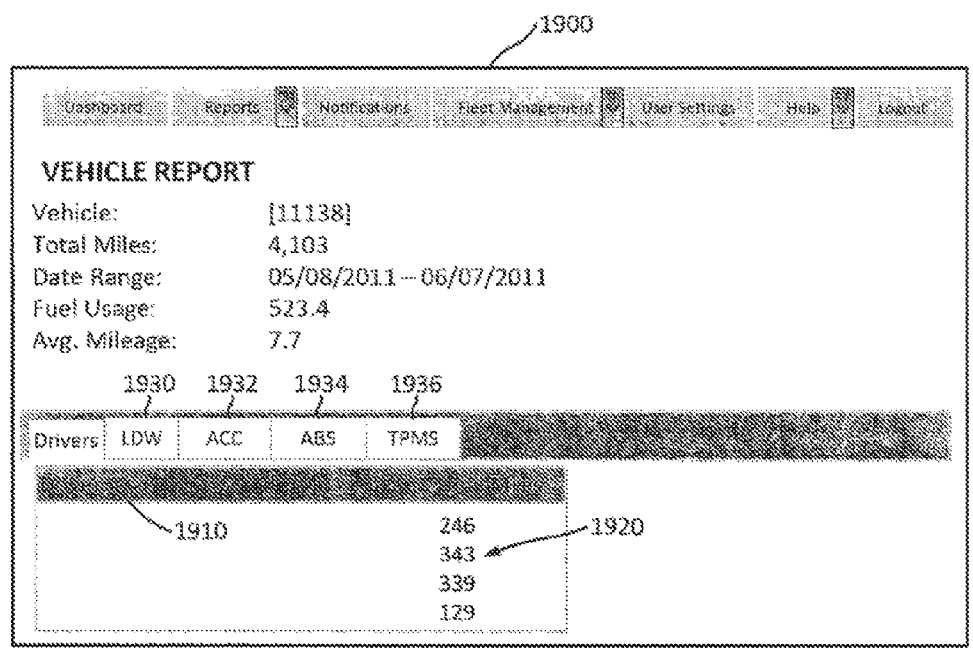
FIG. 19 is an example of an Individual Vehicle Report dynamic graphical user interface according to the example embodiment.

Once the Vehicle Report is created, the subject system presents the user with a summary screen 1800, shown in FIG. 18, displaying all vehicles 1810 actively reporting data over the selected date range. The summary screen 1800 shows miles driven 1820 and any reported Diagnostic Trouble Codes (DTCs or Fault Codes) per vehicle 1830. Selecting a vehicle by clicking a vehicle ID 1840 in the list generates a report specific to that vehicle, as depicted in the Individual Vehicle dynamic graphical user interface Report 1900 shown in FIG. 19. This report 1900 shows the names of each driver 1910 who has been driving the vehicle during the selected date range and the amount of miles driven 1920 by the driver.

Figure 20:
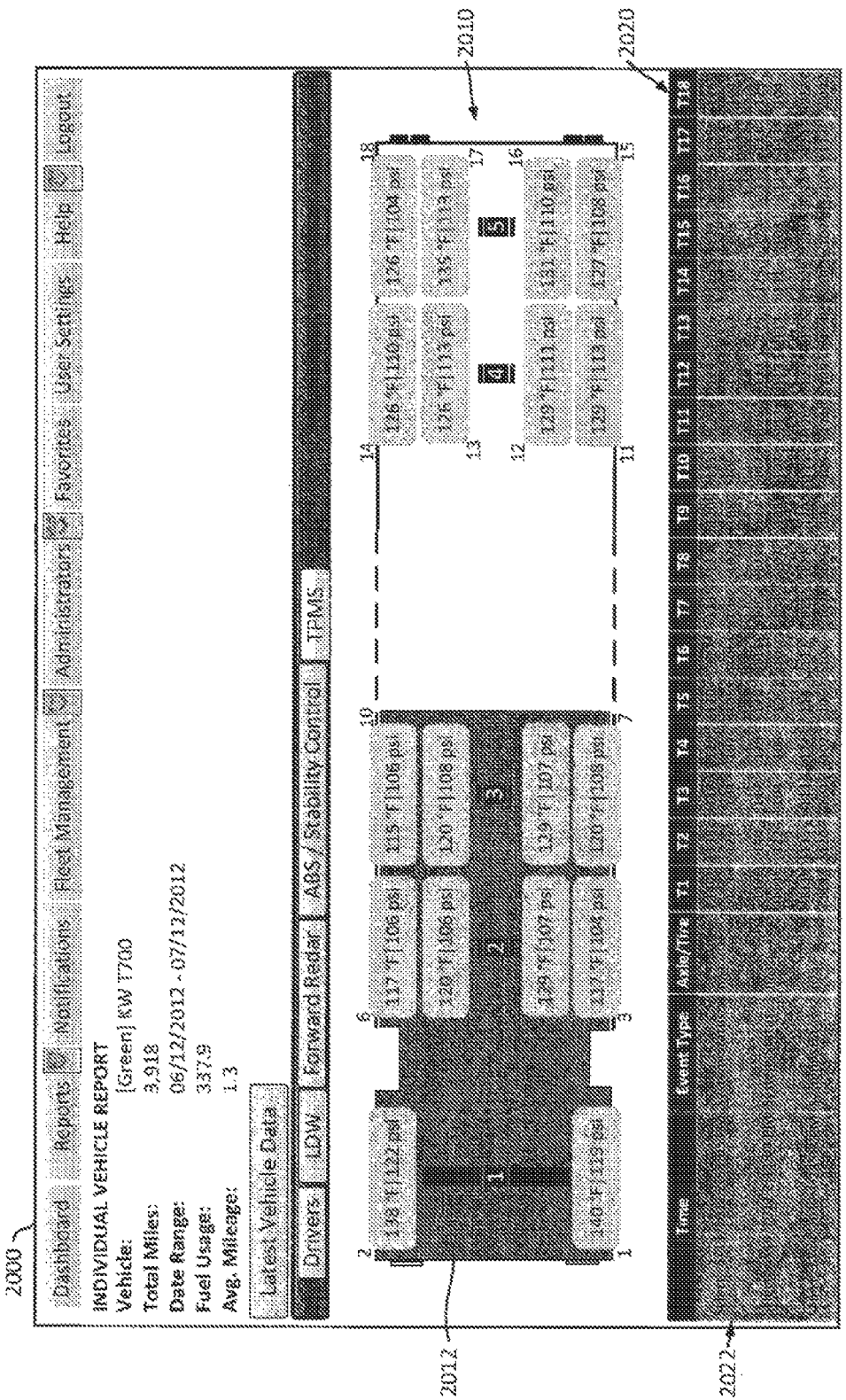
FIG. 20 is an example of a Tire Pressure Monitoring System (TPMS) dynamic graphical user interface display showing tire pressure monitoring values per selected tracked system.

Additional tabs (shown in FIG. 19 and FIG. 20 as including LDW 1930, ACC 1932, ABS 1934, and TPMS 1936) display any desired metrics per tracked system, as shown for example in the dynamic graphical user interface tire pressure monitoring embodiment 2000 of FIG. 20. It is to be understood that many different vehicular systems may be tracked by the fleet management and reporting system of the example embodiment. Selecting the appropriate tab on the graphical screen takes the user to a list of occurrences and from there the ability to review a detailed report of location (or other descriptive item) per event or metric, using the same format as the single event detail screen 1600 of FIG. 16.

The TPMS display 2000 includes, in the example embodiment, a two-dimensional graphical representation 2010 of a vehicle and a table portion 2020 wherein each of the graphical representation 2010 of the vehicle and the table portion contain tire pressure values obtained by the TPMS sensors 224 (FIG. 2) during a selected time period. As shown, during a first selected time period 2022, data from the table portion is selected and distributed into the graphical representation 2010 of the vehicle to graphically illustrate a range of pressures sensed for each tire of the vehicle having a TPMS 224 during the selected time period. In the example embodiment, the vehicle has sixteen (16) tires. It is to be appreciated, however, that the two-dimensional graphical representation 2010 of the vehicle is adapted to match the configuration of other vehicles in the target fleet as necessary or desired wherein a four (4) wheeled vehicle would be represented in the graphical representation 2010

The Vehicle Report 1700-2000 may also be a management tool used for tracking any vehicles that have failed to report data for a period of time. In this regard and with reference again to FIG. 9, the user may select the Reports tab 913 to initiate the queried reporting module 510 (FIG. 5) to execute the queried reporting method 600 of FIG. 6. By selecting 640 a Vehicle Inactivity, the Vehicle Inactivity Report module 518 is invoked at step 642, wherein a Vehicle Inactivity Report generates a Vehicle Inactivity Report dynamic graphical user interface input screen 2100 such as shown, for example, in FIG. 21. To create a report, from the input screen of FIG. 15, the following steps are done:
1) Select at 2110 the number of days of inactivity required for a vehicle to be reported; and
2) Click the 'Run Report' link or button 2120.

Figures 21, 22:
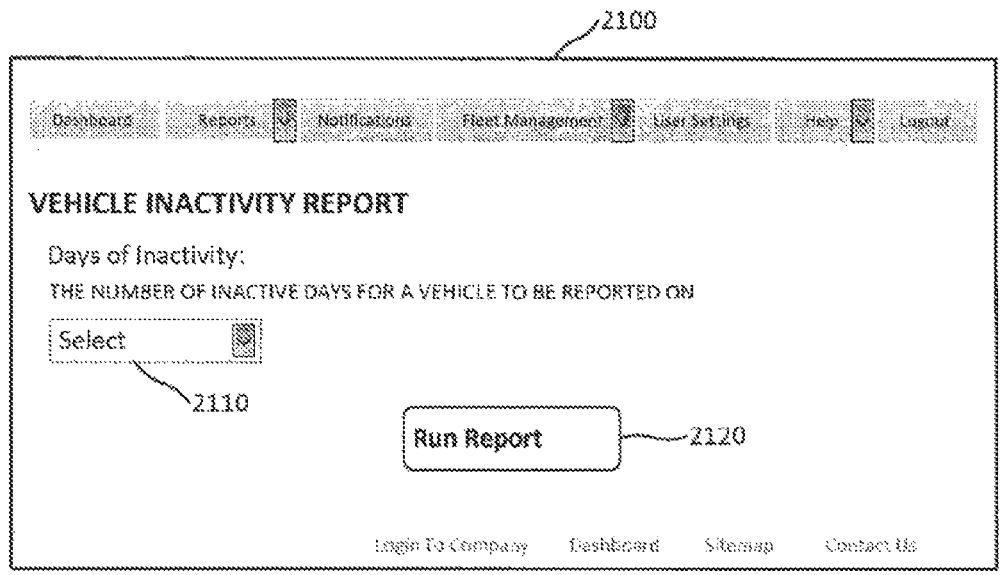
FIG. 21 is an example of a Vehicle Inactivity Report dynamic graphical user interface input screen according to the example embodiment.
FIG. 22 is an example of a Vehicle Inactivity Report dynamic graphical user interface according to the example embodiment.

A Vehicle Inactivity Report 2200 of the example embodiment is shown in FIG. 22 and provides a list of vehicles 2210 that have not reported for at least the specified number of days, and the date 2220 of the last recorded event. Reasons for vehicles not reporting may include system failure, lost connection to or issues with the On-Board Computer (OBC) system, bad connections, or tampering. Vehicle inactivity may also happen if the vehicle has not been driven or is located in an area with poor reception for the OBC system's mode of transmission.

In addition to vehicles that should be reporting but have not, vehicles decommissioned or that have had the processor 200 (FIG. 2) of the subject fleet management and reporting system removed will be displayed on the Vehicle Inactivity Report 2200. To block these vehicles from appearing and adversely cluttering the report, they can be manually decommissioned in the subject system. The Vehicle Inactivity Report 2200 can be printed or downloaded by selecting the "Download/Print" link or button 2230, shown for example in the upper right corner of the screen of the example embodiment.

The system of the example embodiment is also capable of generating Region Reports that are based from division and region-level data. These reports display performance of individual divisions within a region or a rollup of all regions to the company as a whole, enabling top fleet management to see how different regions perform versus each other and the organizational average. The format used is a comparison between a reference month selected by the user and the last completed month, thus showing progress over time. In this regard and with reference again to FIG. 9, the user may select the Reports tab 913 to initiate the queried reporting module 510 (FIG. 5) to execute the queried reporting method 600 of FIG. 6. By selecting 650 a Region Report, the Region Report module 520 is invoked 652.

Selecting the quick link or menu item for Region Report brings up the dynamic graphical user interface input screen 2300 shown in FIG. 23. To create a Region Report 2400 (FIG. 24), the following steps are followed in the example embodiment:

1) The dropdown list 2310 of regions is customized to the user's access level. A Region manager will typically only see his or her Region, whereas a corporate manager will see all Regions;
2) Select at 2320 'All Regions' to see a Company Rollup Report showing the performance of all regions individually or select a specific region for a report on that region only;
3) Choose at 2330 reference month for the report. This will define which month to use as reference to which the most recent completed month will be compared;
4) Choose at 2340 which event types to display by selecting the box next to the event type; and
5) Click the 'Run Report' link or button 2350.

The Region Report 2400, shown in FIG. 24, displays a comparison between the last completed month and the selected reference month. Performance is viewed per event type and in terms of both the total number of events and miles between events. By selecting the 'Graph' link or button 2450, for example in the upper right corner of the page, a graphical presentation (not shown) of the Region Report 2400 is selectively displayed for the user.

The fleet management and reporting system of the example embodiment also allows the user to set up automatic reports and notifications using, for example, the method 700 shown in FIG. 7. In this way, advantageously, Driver/Division reports, Vehicle Reports and Region Reports of the type described above with regard to queried reporting for example, may all be automated to be sent to the user on a regular basis by the system executing one or more of the automated reporting modules 532, 534, 536 (FIG. 5), and immediate notifications may be sent in near-real time if a severe event occurs by the system executing the event notification module 538 (FIG. 5). Selecting 710 the quick link or menu item for Notifications 914 (FIG. 9) brings up the dynamic graphical user interface Notification overview screen 2500 as shown for example in FIG. 25.

This screen 2500 of FIG. 25 shows any scheduled notifications 2510, and gives the user the ability to run, edit or delete existing notification schedules. By selecting the 'Add Notification' link or button 2520 the user will be taken through a setup guide 720 for setting up necessary or desired notifications.

In accordance with the example embodiment, periodic reports can be of the three main types—Periodic Driver/ Division Report, Periodic Vehicle Report or Periodic Region Report. However, other periodic reports may be included as well. They can be scheduled for weekly or monthly updates of one or multiple locations, and for one or multiple users. An example of a periodic report setup summary 2600 in accordance with the example embodiment is shown in FIG. 26. The periodic reports are selectively executed at 730 by the system executing one or more of the periodic report modules 532, 534, 536.

Figure 28:
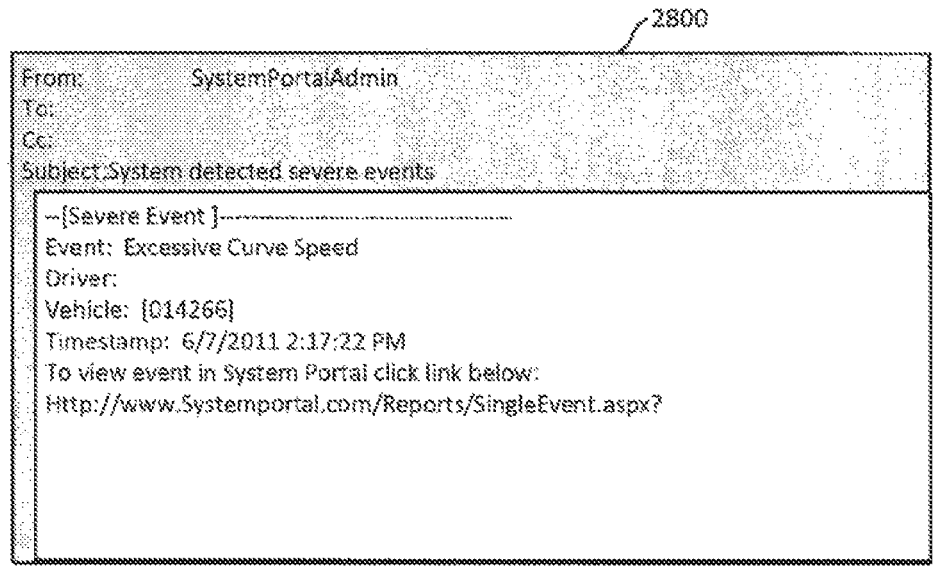
FIG. 28 is an example of a severe notification email according to the example embodiment.

Immediate notifications can be sent out such as shown at 740 by the system executing the event notification module 538 in near-real time when a severe event, as determined by user-selected sever event parameters or limits, has happened. Schedules are set up using the same guide as periodic reports. Immediate notifications can be set up for one or multiple event types and there can be different notification schedules set up for different event types or groups of event types. The last step of the setup guide shows a summary of the notification schedule 2700 in FIG. 27. Once a severe event is recorded an email 2800 is selectively transmitted to one or more designate recipients in the format shown in FIG. 28 for example.

The subject system provides several fleet management functions to the user in accordance with the fleet management modules 540. The system 100 allows users with the fleet manager role to set up or modify a long list of functions, so that for example users can manage drivers, vehicles, users, user roles, and regions and divisions. Access to these Fleet Management functions is through the menu items at the top of most screens in the subject system under the pull-down menu with the heading "Fleet Management" 915 (FIG. 9).

Figure 29:
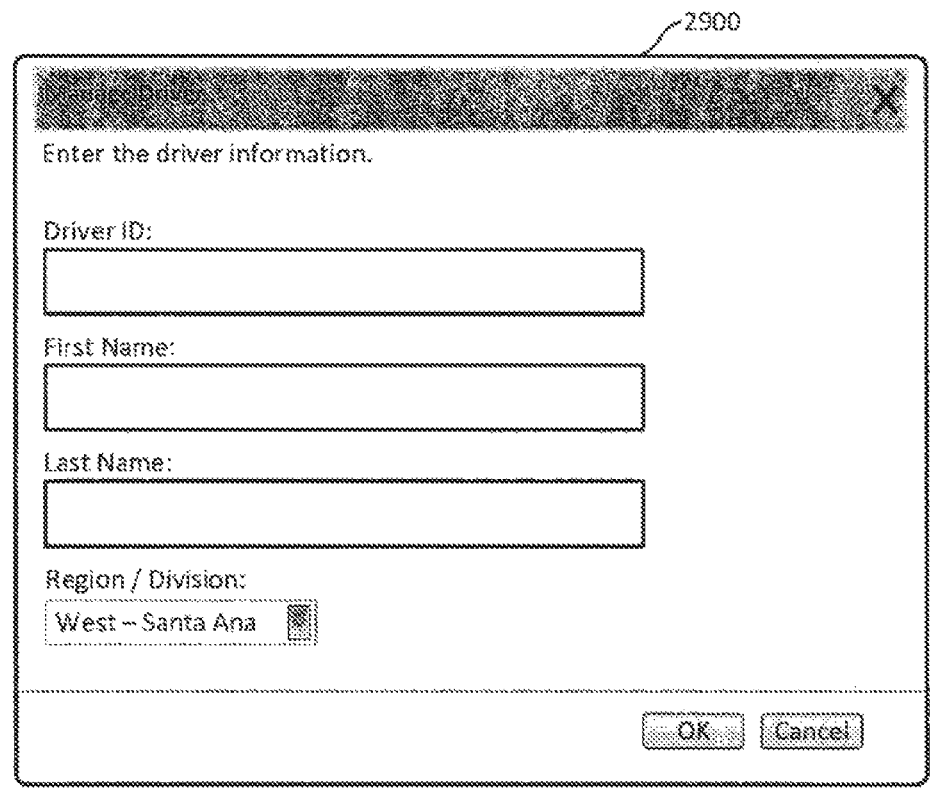
FIG. 29 is an example of a driver configuration dynamic graphical user interface input screen for entering a driver into the fleet management system according to the example embodiment.

A driver can be entered into the database of the system of the example embodiment in multiple ways. In one such method, a driver may be entered manually through selecting 'Add Driver' in the Manage Drivers display screen section 2900 (FIG. 29) under Fleet Management 916. Users in this process should assign a driver to the correct division. As noted herein, drivers are assigned to a home division, which is where all the driver's miles will be displayed, regardless of vehicle driven. A driver configuration screen in accordance with the example embodiment is shown in FIG. 29.

A driver may also be entered into the database when events are tagged with a driver name, and this is often the most common way of entering drivers. If that driver does not already exist in the database the name will be added to the database under a 'Default' region and division. Fleet managers can later edit drivers to assign them to the correct region and division.

Selecting the menu item 'Manage Vehicles' under 'Fleet Management' 915 generates a dynamic graphical user interface Vehicle Management page 3000, as shown for example in FIG. 30. The Manage Vehicles function allows fleet managers to view all active vehicles 3010 in their fleets or organizations, depending on level of access. Vehicle information (such as make, model, year) can be added for sorting and a vehicle can also be actively decommissioned to remove it from active monitoring and display in the Vehicle Inactivity Report, as mentioned herein.

Figure 31:
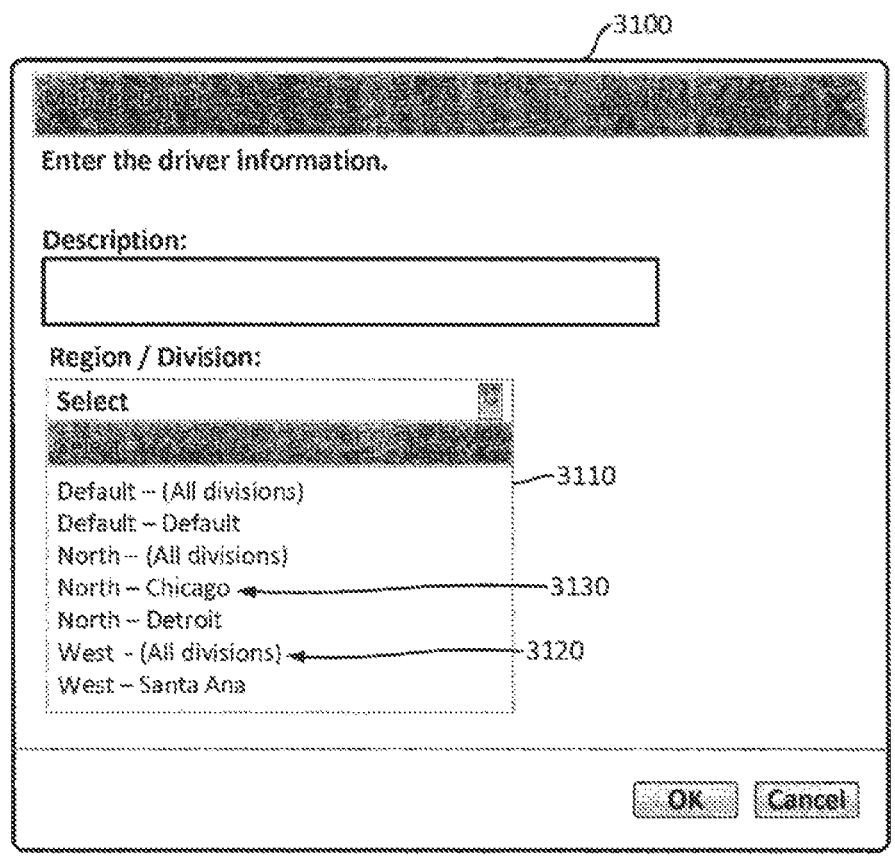
FIG. 31 is an example of a User Role Management Setup dynamic graphical user interface page for creating a user role according to the example embodiment; and, FIG. 32 is an example of a Fleet Structure Management dynamic graphical user interface screen according to the example embodiment.

Options for managing users and user roles allows fleet managers to add or modify users to the fleet, and also manage the roles these users can be assigned. FIG. 31 shows an example of the User Role Management Setup page 3100 for creating a user role.

In accordance with the example embodiment, to create a role accessing the complete Northern Region, the description could be "Northern Region Manager", and in the dropdown selection 3110 the 'North—(All divisions)' item 3120 should be selected. To create a sub level in the Northern region, e.g. a "Chicago Division Manager"—the item for 'North—Chicago' 3130 should be selected.

The result would be that a user assigned the role of 'Chicago Division Manager' could access a division report for the Chicago division and data for all drivers reporting to that division. A user assigned the role of 'Northern Region Manager' would have access to division reports and drivers in both Chicago and Detroit regions, as well as region reports for the Northern region. The highest level of access in a fleet is the fleet manager access, granting access to all regions and all divisions.

Figure 32:
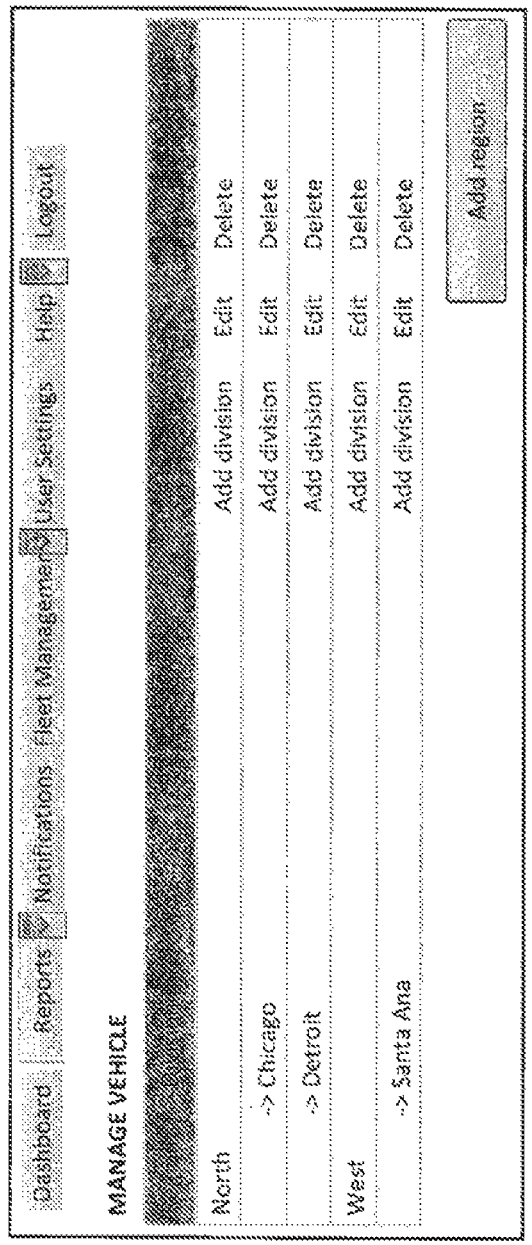

The fleet structure, as described herein, may be edited using the last option under the 'Fleet Management' menu item. FIG. 32 shows a Fleet Structure Management Screen.

The present invention also includes a "User Settings" function. Accessible from a pull-down menu from the Dashboard and other pages. User Settings lets users see and configure their own user settings and access level. One example of a user's ability to configure settings is the ability to change a password.

The fleet management and reporting system of the example embodiment includes a number of embedded functionalities in accordance with execution by the system of the embedded functions module 550 (FIG. 5) that provide the user with data to evaluate both driver and vehicle performance in the present invention.

One example of an embedded functionality is a Lane Detection Warning (LDW) system. Lane detection functionality is controlled by a LDW processor that saves data at each event. Event types and data saved per event are discussed herein. LDW data is generate from processor internal sources such as LDW algorithm, system internal sources such as the LDW camera unit or other integrated sensors, or external sources such as the vehicle data bus. The LDW processor also pulls available data from the On-Board Computer (OBC) device 200 (FIG. 2), such as GPS location, current driver, speedometer, etc.

In another embedded functionality that may apply across all types of data collected by embedded functionalities, the fleet management and reporting system of the example embodiment selectively encrypts data and packages the data in a binary format 120 (FIG. 1), specific to the transmission channel used and sent over the respective communications channel on a periodic basis. Data encryption may occur using any known method. The use of data encryption in the fleet management and reporting system of the example embodiment ensures that any third party servers or other entities that handle, utilize, transmit, or receive the data do not comprise the integrity of that data.

Data captured by embedded functionalities within the fleet management and reporting system of the example embodiment may include:
  Lane Departure Warning—Crossing lane marking without using turn signal, and going back into original lane;
  Excessive Lane Departure—Crossing lane marking without turn signal and continuing past a second limit, set at a particular distance past the inside of the lane marking;
  Lane Change w/o Turn Signal—Crossing a lane mark without using turn signal, and continuing to adjacent lane;
  Loss of Video Tracking—The unit has not been able to track for a period of ten minutes. This may be caused by, for example, tampering or the lens being covered;
  LDW System Disabled—System Disabled by driver;
  Distance Alert—An audible and visual warning, alerting the driver that the distance between the vehicle and a forward vehicle is some number of seconds or less.
  Forward Collision Warning—An urgent audible and visual warning of an impending collision with another vehicle or object;
  Haptic Warning—This may be in the form of a brake pulse applied to the vehicle to warn of an impending collision if the driver has not reacted to the Distance Alert nor the Forward Collision Warning;
  Collision Mitigation Braking—Automated de-throttling of the engine, and/or application of the engine and foundation brakes when an collision is imminent
  ATC—An event where engine braking and/or foundation braking occurs to prevent loss of traction at the wheels of the vehicle;
  ESC—An event where engine braking and/or foundation braking occurs to prevent vehicle directional instability in order to keep the vehicle traveling on its intended path;
  RSC—An event where engine braking and/or foundation braking occurs to stabilize the vehicle during a possible roll-over situation;
  ABS—A driver initiated brake event when the ABS system is activated;
  Excessive Braking—Braking with a longitudinal deceleration in excess of 0.4 g, while at speeds greater than 20 mph;
  Excessive Curve Speed High speed going through curve. Limit for event log, for example, is a lateral acceleration of 0.4 g;
  Tire Pressure—Monitoring for low tire pressure in any wheel and monitoring for instantaneous tire pressure in all tires of vehicle equipped with pressure sensors;
  Engine Data—various engine parameters and metrics such as temperature, low oil pressure, high revs detection, and the like.

Statistical data generated by the fleet management and reporting system of the example embodiment may include:
  Average following distance—An average following distance measured in seconds, for the time a vehicle is followed and tracked by radar (or vision FCW);
  Average ACC use—Percentage of driving time driven with Autonomous Cruise Control (ACC) system (if available) activated.

Data captured for a particular event may include:
  Event Type;
  Day/Night;
  System Status—For example, whether it is tracking, not tracking, low speed, fault detected, etc.;
  Speed of event;
  Warning active;
  Warning Left;
  Warning Right;
  Lane Change Left;
  Lane change Right;
  X acceleration—Longitudinal acceleration/braking;
  Y acceleration—Lateral acceleration;
  Odometer;
  DTCs present—Diagnostic Trouble Codes of LDW, ABS systems;
  Time of day;
  Date;
  Latitude—From GPS (if available);
  Longitude—From GPS (if available);
  Driver ID.
  Tire pressure lower than predetermined threshold.

Data for a particular severe event is collected if a severe event threshold is exceeded, for example for 10 seconds before and after the event. Data is saved in increments of time, for example every 250 ms. Severe event data may include:
  Vehicle speed (mph);
  Tractor Yaw (1/mile)—Curvature, amount of turning;
  Turning Force (g)—this is technically y-acceleration;
  Braking force (g)—his is technically x-acceleration;
  Speed of forward vehicle (mph);
  Distance to forward vehicle (ft);
  Forward Collision Warning;
  Target Detected;
  ACC Mode;
  Accelerator pedal (%);
  Engine speed (rpm);
  Brake pedal (%);
  Collision Mitigation Braking—0.35 g brake request;
  Haptic Warning—0.25 g brake pulsation;
  ACC speed setting (mph);

Following Distance Alert using data collected from ACC system;
ABS Active;
ATC active (engine/brake)—Automatic Traction Control;
ESC active (engine/brake)—Electronic Stability Control;
RSC active (engine/brake)—Roll Stability Control;
ACC Shutdown message.

Another embedded functionality in the fleet management and reporting system of the example embodiment is a video recording system and module that is capable of capturing a video feed using the LDW camera 245 (FIG. 2). When video recording is enabled, the fleet management and reporting system of the example embodiment continuously records a stream of jpeg images to dual alternating buffers. Once a triggering event is recorded, a save process is initiated and video for that event is stored to non-volatile memory. Length of video recording is selectable within parameters between, for example, 0-30 seconds before and 0-30 seconds after an event. Video frame rate and resolution are also selectable and therefore customizable by the user.

Saving video may be triggered by any severe event and a parameter is available for the user to select which event should trigger video to be saved. Once video is recorded, users may manually download video using a software tool. The fleet management and reporting system of the example embodiment also provides a method of transferring or transmitting the video files or images through different communications channels. Video data transmission may occur over small packets of data, so that video files are rebuilt after reception for display. It is also contemplated that the MPEG format or any other formats may also be used as necessary or desired for video images for lossless compressions.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A method of aggregating data derived from a vehicular fleet for presentation to an associated user, the method comprising:
accumulating first plural event data from a first vehicle-mounted device configured to capture and record first on-board vehicular data associated with one or more of a particular driver in a fleet of vehicles and/or a particular vehicle in the fleet of vehicles;
accumulating second plural event data from a second vehicle-mounted device configured to capture and record second on-board vehicular data associated with the one or more of the particular driver and/or the particular vehicle;
combining the accumulated first plural event data into first hybrid event data;
combining the accumulated second plural event data into second hybrid event data;
selectively compressing and encrypting the first and second hybrid event data as processed hybrid event data;
transmitting the processed hybrid event data to a server for aggregation of the processed hybrid event data in one or more reporting and notification modules;
packaging the processed hybrid event data aggregated in the one or more reporting and notification modules into a preselected format; and,
presenting, to the associated user via a user interface configured to generate a display, the packaged hybrid event data in a form that permits the associated user to analyze and monitor a performance of one or more of the particular vehicle and/or the particular driver.

2. The method according to claim 1, wherein:
the presenting comprises presenting to the associated user via the user interface the packaged hybrid event data in a form that permits the associated user to analyze and monitor a performance of a particular driver relative to one or more other drivers in a sorted performance report display.

3. The method according to claim 2, wherein:
the presenting the packaged hybrid event data in the sorted performance report display comprises presenting the packaged hybrid event data in the sorted performance report comprising a color coded grid of the particular driver and the one or more other drivers versus plural hybrid event data associated with each driver, wherein separate cells of the grid are assigned separate colors relating the a predetermined seriousness parameter of the plural hybrid data.

4. The method according to claim 1, wherein:
the presenting comprises presenting, to the associated user via the user interface, the packaged hybrid event data in a form that permits the associated user to analyze and monitor the performance of the one or more of the particular vehicles and/or the particular drivers relative to one or more other drivers by displaying a graph of the set of drivers and one or more plural event data types associated with each driver of the set of drivers, wherein the graph is a histogram displaying the set of drivers versus a following distance hybrid event data related to each of the set of drivers.

5. The method according to claim 1, wherein:
the accumulating comprises accumulating driver event data from one or more of the first and/or second vehicle-mounted devices configured to capture video images from an area adjacent to a vehicle and record on-board vehicular data associated with a particular driver in the fleet of vehicles.

6. The method according to claim 5, wherein:
the presenting comprises presenting to the associated user via the user interface the packaged hybrid event data in a form that permits the associated user to analyze and monitor the performance of the particular driver relative to one or more other drivers by displaying a customizable video format to the associated user.

7. The method according to claim 1, wherein:
the accumulating the second event data comprises accumulating the second event data from the second vehicle-mounted device different than the first vehicle-mounted device.

8. The method according to claim 1, wherein:
the selectively compressing and encrypting the first and second hybrid event data comprises compressing and encrypting the first and second hybrid event data together as the processed hybrid event data.

9. A method of managing a vehicular fleet, comprising:
recording, by a first driver event capture device disposed in a first vehicle of a fleet of associated vehicles, first driver and vehicle event data representative of a first driver operating the first vehicle;

recording, by a second driver event capture device disposed in a second vehicle different than the first vehicle of the fleet of associated vehicles, second driver and vehicle event data representative of a second driver different than the first driver operating the second vehicle;

combining the first driver and vehicle event data into first processed data representative of first higher level driver and vehicle condition data;

combining the second driver and vehicle event data into second processed data representative of second higher level driver and vehicle condition data; and presenting the first and second processed data for customizable analysis, by an associated user, of driver behavior of the first and second drivers of the fleet of vehicles using a web-based portal and user interface comprising one or more reporting and notification modules, wherein the presenting comprises selectively presenting to the associated user via the user interface the recorded first and second driver and vehicle event data in a form that permits the user to analyze and monitor a performance of the first and second drivers relative to each other by displaying a graph of the first and second drivers and one or more plural event data types associated with each driver, wherein the graph is a histogram displaying the first and second drivers versus a following distance event data related to each of the first and second drivers.

10. The method according to claim 9, wherein:

the presenting comprises presenting to the associated user via the user interface the recorded first and second driver and vehicle event data in a sorted performance report display.

11. The method according to claim 10, wherein:

the presenting the first and second driver and vehicle event data in the sorted performance report display comprises presenting the first and second driver and vehicle event data in the sorted performance report comprising a color coded grid of the first and second drivers and the one or more other drivers versus plural driver and vehicle event data accumulated from the first and second driver event capture devices associated with each driver, wherein separate cells of the grid are assigned separate colors relating the a predetermined seriousness parameter of the plural event data.

12. The method according to claim 9, wherein:

the configuring the first and second driver event capture devices comprises configuring the first and second driver event capture devices to record at least video data of areas adjacent each vehicle.

13. The method according to claim 9, wherein:

the presenting comprises presenting to the associated user via the user interface the processed data in a form that permits the associated user to analyze and monitor a performance of a selected driver relative to the other driver by displaying a customizable video format to the associated user.

14. The method of managing a vehicular fleet according to claim 9, wherein:

the first driver and vehicle event data comprises data relating to the first driver in the fleet of vehicles and first data relating to the first vehicle of the fleet of vehicles being operated by the first driver; and the second driver and vehicle event data comprises data relating to the second driver in the fleet of vehicles and second data relating to the second vehicle of the fleet of vehicles being operated by the second driver.

15. A method of monitoring driver safety metrics in a fleet of vehicles, the method comprising:

capturing first event data from a first monitored vehicle in the fleet of vehicles, wherein the first event data comprises first on-board vehicular data of the first monitored vehicle and first video data of an area adjacent the first monitored vehicle in the fleet of vehicles being operated by a first driver;

capturing second event data from a second monitored vehicle in the fleet of vehicles, wherein the second event data comprises second on-board vehicular data of the second monitored vehicle and second video data of an area adjacent the second monitored vehicle in the fleet of vehicles being operated by a second driver combining the first on-board vehicular data and the first video data of the first event data to obtain first hybrid event data;

combining the second on-board vehicular data and the second video data of the second event data to obtain second hybrid event data;

securely transmitting the first and second hybrid event data to an associated server;

receiving the first and second hybrid event data in a packaged data format from the associated server;

establishing driver safety metrics from the first and second hybrid event data received in the packaged data format from the associated server;

reporting the driver safety metrics based on customizable preferences and organization as determined by an associated user responsible for one or more drivers of vehicles via a web-based portal and user interface configured to present the first and second hybrid event data; and, notifying the associated user of severe driver events, the reporting the driver safety metrics and the notifying the associated user of the severe event data permitting the associated user to monitor driver safety and vehicle and driver performance.

16. The method according to claim 15, wherein:

the reporting comprises presenting to the associated user via the user interface the first and second hybrid event data in a form that permits the associated user to analyze and monitor the performance of the first driver relative to the second driver in a sorted performance report display.

17. The method according to claim 16, wherein:

the reporting comprises presenting the first and second hybrid event data in a sorted performance report comprising a color coded grid of the first driver and the second driver versus the first and second plural on-board vehicular data accumulated from a first device mounted on the first monitored vehicle and from a second device mounted on the second monitored vehicle, wherein separate cells of the grid are assigned separate colors relating the a predetermined seriousness parameter of the plural event data.

18. The method according to claim 15, wherein:

the reporting comprises presenting to the associated user via the user interface the packaged first and second hybrid event data in a form that permits the associated user to analyze and monitor the performance of the first driver relative to the second by displaying a graph of the first and second drivers and one or more plural event data types associated with each driver of the first and second drivers, wherein the graph is a histogram displaying the first and second drivers versus a following distance event data related to each of the first and second drivers.

19. The method according to claim 15, wherein:
the reporting comprises presenting to the associated user via the user interface the first and second hybrid event data in a form that permits the associated user to analyze and monitor the performance of the first driver relative to the second driver by displaying a customizable video format to the associated user.

20. A fleet management system, comprising:
a first capture device disposed in a first associated vehicle of an associated fleet of vehicles, the first associated vehicle being selectively operated by a set of first and second drivers, the first capture device being configured to record first event data comprising plural event data types relating to operation of the first associated vehicle operated by the set of first and second drivers;
a second capture device disposed in a second associated vehicle of the associated fleet of vehicles, the second associated vehicle being selectively operated by the set of first and second drivers, the second capture device being configured to record second event data comprising plural event data types relating to operation of the second associated vehicle operated by the set of first and second drivers;
a transmission module configured to transmit the captured first and second event data to at least one associated service provider;
a server having a non-transitory memory and a processor in operative communication with the at least one associated service provider, the server being configured to receive the first and second event data from the at least one associated service provider, combine the first event data comprising the plural event data types relating to the operation of the first associated vehicle operated by the set of the first and the second drivers into first hybrid event data, combine the second event data comprising the plural event data types relating to the operation of the second associated vehicle operated by the set of the first and the second drivers into second hybrid event data, and package the first and second hybrid event data into a preselected format for analysis by an associated end user; and
one or more reporting and notification modules configured to aggregate the packaged first and second hybrid event data and present the aggregated first and second hybrid event data in a customizable format combining the aggregated first and second hybrid event data to the associated end user operating an associated client computer accessing a web application by a web-based portal in a web application executable by a server and having a user interface via the web-based portal,
wherein the first and second capture devices in each first and second associated vehicle in the associated fleet of vehicles are configured to record plural event data types relating to operation of the associated first and second associated vehicles driven by the first and second drivers,
wherein the transmission module is configured to transmit the captured plural event data types to the at least one associated service provider,
wherein the server is configured to receive the plural event data types from the at least one associated service provider and package the plural event data types into the preselected format for analysis by the associated end user,
wherein the one or more reporting and notification modules of the web application are configured to aggregate the packaged event data and present the packaged first and second hybrid event data in a customizable format to the associated end user by displaying a list of the first and second drivers and one or more plural event data types associated with each driver of the first and second drivers, wherein the list is sorted as a sorted performance report based on driver performance relative to the one or more plural event data types associated with each driver.

21. The fleet management system according to claim 20 wherein:
the one or more reporting and notification modules of the web application are operative to package and present the first and second hybrid event data into a format relating the first and second drivers with the first and second associated vehicles of the associated fleet of vehicles driven by the first and second drivers during a time period selected by the end user.

22. The fleet management system according to claim 21 wherein:
the one or more reporting and notification modules are configured to generate the sorted performance report comprising a color coded grid of the first and second drivers versus the plural event data types associated with each driver, wherein separate cells of the grid are assigned separate colors relating the a predetermined seriousness parameter of the plural event data types.

23. The fleet management system according to claim 21 wherein:
the transmission module is configured to transmit the captured plural event data types to the at least one associated service provider;
the server is configured to receive the plural event data types from the at least one associated service provider and package the plural event data types into the preselected format for analysis by the associated end user; and
the one or more reporting and notification modules of the a web application are configured to aggregate the packaged event data and present the packaged event in a customizable format to the end user by displaying a graph of the first and second drivers and one or more plural event data types associated with each driver of the first and second drivers, wherein the graph is a histogram displaying the first and second drivers versus following distance event data related to each of the first and second drivers' operation of the first and second associated vehicles.

24. The fleet management system according to claim 20, wherein:
the at least one capture device is configured to record video event data;
the transmission module is configured to encode the captured video event data into packets and wirelessly transmit the captured video event data to the at least one associated service provider;
the server is configured to receive the video event data encoded into the packets from the at least one associated service provider and package the encoded video; and
the one or more reporting and notification modules of the web application are configured to aggregate the packaged video event data and present the aggregated packaged video event data in a customizable video format to the end user operating an associated client computer accessing the web application by the web-based portal.

25. A driver safety monitoring system, comprising:
a first driver event data capture apparatus installed in a first vehicle of a fleet of vehicles, the first driver event data capture apparatus having an image capture module configured to capture images from a first camera and a first on-board computer connection module configured to record plural first event data associated with a first driver's operation of the first vehicle;
a second driver event data capture apparatus installed in a second vehicle of the fleet of vehicles, the second driver event data capture apparatus having a second image capture module configured to capture images from a second camera and a second on-board computer connection module configured to record plural second event data associated with a second driver's operation of the second vehicle;
a server configured to poll one or more third party service providers for first and second driver event data wirelessly transmitted from the first and second driver event data capture apparatus, combine the plural first event data associated with the first driver's operation of the first vehicle into first hybrid event data, combine the plural second event data associated with the second driver's operation of the second vehicle into second hybrid event data, and package the first and second hybrid event data for combined presentation on one or more web-based portals; and
a plurality of customizable reporting and notification modules configured to aggregate the packaged first and second hybrid event data and present the packaged first and second hybrid event data in a customizable format to an associated fleet manager end user in a form that permits the associated fleet manager end user to analyze and monitor a performance of the first and second drivers relative to each other by displaying a list of the first and second drivers and one or more plural event data types associated with each driver of the first and second drivers thereby allowing the associated fleet manager end user to analyze the packaged first and second hybrid event data and monitor performance of the first and second drivers in real time and regardless of which vehicle the first and second drivers has driven.

26. The driver safety monitoring system according to claim 25, wherein:
each said first and second driver event data capture apparatus installed in each first and second vehicle of the fleet of vehicles comprises at least one of an ABS system, a TPMS system, an ESP system, an ACC system, or any combination of an ABS system, a TPMS system, an ESP system, and an ACC system; and,
each said first and second driver event data capture apparatus is configured to communicate directly with the server to wirelessly transmit data from the at least one of the ABS system, the TPMS system, the ESP system, and the ACC system to the server as the first and second driver event data.

27. A server architecture supporting a fleet management and driver safety monitoring system, comprising:
a plurality of connectors for communicating with one or more third party service providers to import:
first driver event data comprising a first data stream of numeric raw data, first video raw data, and first hybrid event data comprising combined first plural event data associated with a first driver's operation of a first vehicle, wherein at least one of the first plural event data combined to form the first hybrid event data comprises following distance event data associated with the first driver's operation of the first vehicle; and
second driver event data comprising a second data stream of numeric raw data, second video raw data, and second hybrid event data comprising combined second plural event data associated with a second driver's operation of a second vehicle, wherein at least one of the second plural event data combined to form the second hybrid event data comprises following distance event data associated with the second driver's operation of the second vehicle;
a decoder service decoding the first and second driver event data into specific, usable data for combined presentation of the decoded first and second driver event data to an end user, the first and second numeric raw data being parsed into an import service for processing and the first and second video raw data being parsed into a video file service for processing, the video file service storing and indexing video frames received as part of the video raw data a web application providing a user interface for fleet managers to access reports, schedule notifications, and perform other data analysis functions on the first and second driver event data; and
a database environment comprising a master database for storing fleet and charting information, a report database for storing processed on which reports are to be run, and an import state database for storing data needed by the import service for processing.

* * * * *